US012365418B2

(12) United States Patent
Bosworth et al.

(10) Patent No.: US 12,365,418 B2
(45) Date of Patent: *Jul. 22, 2025

(54) COMPOSITE STRUCTURES AND METHODS OF FORMING COMPOSITE STRUCTURES

(71) Applicant: ASTRO TECH CO., LTD., Changhua (TW)

(72) Inventors: Benjamin K. Bosworth, Morrison, CO (US); Matthew T. Giaraffa, Golden, CO (US); Samuel D. Nichols, Lakewood, CO (US); Togay Yuvanc, Lakewood, CO (US)

(73) Assignee: ASTRO TECH CO., LTD., Changhua (TW)

( * ) Notice: Subject to any disclaimer, the term of this patent is extended or adjusted under 35 U.S.C. 154(b) by 252 days.

This patent is subject to a terminal disclaimer.

(21) Appl. No.: 18/089,950

(22) Filed: Dec. 28, 2022

(65) Prior Publication Data

US 2023/0139946 A1 May 4, 2023

Related U.S. Application Data

(63) Continuation of application No. 17/690,179, filed on Mar. 9, 2022, now Pat. No. 11,572,124.

(60) Provisional application No. 63/158,703, filed on Mar. 9, 2021.

(51) Int. Cl.
*B62K 19/16* (2006.01)
*B29C 70/22* (2006.01)
*B32B 1/08* (2006.01)
*B32B 3/08* (2006.01)
*B32B 5/26* (2006.01)
*B29L 31/30* (2006.01)

(52) U.S. Cl.
CPC ............ *B62K 19/16* (2013.01); *B29C 70/222* (2013.01); *B32B 1/08* (2013.01); *B32B 3/08* (2013.01); *B32B 5/26* (2013.01); *B29L 2031/3091* (2013.01); *B32B 2260/023* (2013.01); *B32B 2260/046* (2013.01)

(58) Field of Classification Search
CPC ...... B62K 19/16; B29C 70/222; B29C 70/446
See application file for complete search history.

(56) References Cited

U.S. PATENT DOCUMENTS

| | | |
|---|---|---|
| 3,075,573 A | 1/1963 | Piazze et al. |
| 3,684,645 A | 8/1972 | Temple et al. |
| 4,548,422 A | 10/1985 | Michel et al. |
| 4,613,146 A | 9/1986 | Sharp et al. |
| 4,636,344 A | 1/1987 | McDougall |
| 4,657,795 A | 4/1987 | Foret |
| 4,874,948 A | 10/1989 | Cielo et al. |
| 4,902,458 A | 2/1990 | Trimble |
| 5,011,172 A | 4/1991 | Bellanca et al. |
| 5,039,470 A | 8/1991 | Bezin et al. |
| 5,128,192 A | 7/1992 | Narasaki |
| 5,173,142 A | 12/1992 | Billiu |
| 5,176,868 A | 1/1993 | Davis |
| 5,194,212 A | 3/1993 | Bonnett |
| 5,240,661 A | 8/1993 | Parker et al. |
| 5,246,275 A | 9/1993 | Arredondo, Jr. |
| 5,262,118 A | 11/1993 | Fukushima et al. |
| 5,277,479 A | 1/1994 | Koyama et al. |
| 5,282,673 A | 2/1994 | Koyama et al. |
| 5,350,556 A | 9/1994 | Abe et al. |
| 5,415,463 A | 5/1995 | Olson et al. |
| 5,437,899 A | 8/1995 | Quigley |
| 5,456,481 A | 10/1995 | Allssop et al. |
| 5,464,240 A | 11/1995 | Robinson et al. |
| 5,540,485 A | 7/1996 | Enders |
| 5,580,626 A | 12/1996 | Quigley et al. |
| 5,585,155 A | 12/1996 | Heikkila et al. |

(Continued)

FOREIGN PATENT DOCUMENTS

| | | |
|---|---|---|
| DE | 102008028441 | 12/2009 |
| DE | 102013223298 | 5/2015 |
| EP | 0440753 | 6/1994 |
| EP | 1149014 | 10/2001 |
| EP | 1506882 | 2/2005 |
| EP | 2615018 | 7/2013 |
| EP | 2615019 | 7/2013 |
| EP | 3670158 | 6/2020 |
| EP | 3950304 | 2/2022 |
| EP | 3974141 | 3/2022 |
| EP | 3974465 | 3/2022 |
| GB | 2421926 | 7/2006 |

(Continued)

OTHER PUBLICATIONS

International Preliminary Report on Patentability for International (PCT) Application No. PCT/US2022/019490, dated Sep. 21, 2023, 8 pages.

(Continued)

*Primary Examiner* — Gregory Listvoyb
(74) *Attorney, Agent, or Firm* — MUNCY, GEISSLER, OLDS & LOWE, P.C.

(57) ABSTRACT

Composite structures and methods of forming composite structures are provided. A composite structure as disclosed herein incorporates one or more composite structure components, such as composite panels and composite inserts. A composite panel is formed from one or more sheets of fiber reinforced thermoplastic material. Composite inserts can include one or more composite blocks or braided sleeves. A composite block can be formed as a stacked or molded structure from trimmings or waste produced during the formation of the composite structures. A braided sleeve can include a seamless, woven sleeve formed of reinforcing fibers and thermoplastic threads. In a completed composite structure, composite inserts are at least partially disposed within a volume defined by surfaces of composite panels. The various composite structures and inserts can be given a final shape and can be fused to one another in a molding and fusing step.

7 Claims, 26 Drawing Sheets

(56) References Cited

U.S. PATENT DOCUMENTS

| | | |
|---|---|---|
| 5,609,349 A | 3/1997 | Buckmiller et al. |
| 5,624,519 A | 4/1997 | Nelson et al. |
| 5,641,366 A | 6/1997 | Hohman |
| 5,769,442 A | 6/1998 | Robinson et al. |
| 5,842,711 A | 12/1998 | Legerot |
| 5,853,651 A | 12/1998 | Lindsay et al. |
| 5,879,342 A | 3/1999 | Kelley |
| 5,948,505 A | 9/1999 | Puppin |
| 5,985,197 A | 11/1999 | Nelson et al. |
| 6,042,765 A | 3/2000 | Sugahara et al. |
| 6,165,407 A | 12/2000 | Tahara et al. |
| 6,190,598 B1 | 2/2001 | Murphy et al. |
| 6,228,312 B1 | 5/2001 | Boyce |
| 6,248,024 B1 | 6/2001 | Nelson et al. |
| 6,270,104 B1 | 8/2001 | Nelson et al. |
| 6,340,509 B1 | 1/2002 | Nelson et al. |
| 6,352,485 B1 | 3/2002 | Philpot et al. |
| 6,638,466 B1 | 10/2003 | Abbott |
| 6,746,737 B2 | 6/2004 | Debalme et al. |
| 6,761,187 B1 | 7/2004 | Zoellner |
| 7,140,628 B2 | 11/2006 | Parkin |
| 7,603,776 B2 | 10/2009 | Jager |
| 8,101,040 B2 | 1/2012 | Shibata et al. |
| 8,101,262 B2 | 1/2012 | Yamanouchi et al. |
| 8,117,679 B2 | 2/2012 | Pierce |
| 8,128,164 B2 | 3/2012 | Segato |
| 8,591,693 B2 | 11/2013 | Jaeschke et al. |
| 8,689,670 B2 | 4/2014 | Levesque |
| 8,863,616 B2 | 10/2014 | Ciavatta et al. |
| 8,882,207 B2 | 11/2014 | Matsui et al. |
| 9,249,295 B2 | 2/2016 | Nakayama et al. |
| 9,302,445 B2 | 4/2016 | Kamiya et al. |
| 9,481,145 B2 | 11/2016 | Hatanaka et al. |
| 9,505,928 B2 | 11/2016 | Hirata et al. |
| 9,616,704 B2 | 4/2017 | Werner et al. |
| 9,688,097 B2 | 6/2017 | Meggiolan et al. |
| 9,718,248 B2 | 8/2017 | Marcoe et al. |
| 9,808,996 B2 | 11/2017 | Marcoe |
| 10,016,953 B2 | 7/2018 | Hawley et al. |
| 10,022,898 B2 | 7/2018 | Takano et al. |
| 10,059,078 B2 | 8/2018 | Carson, Jr. et al. |
| 10,093,777 B2 | 10/2018 | Takebe et al. |
| 10,189,190 B2 | 1/2019 | Krahnert et al. |
| 10,213,972 B2 | 2/2019 | Buchmann et al. |
| 10,265,923 B2 | 4/2019 | Marcoe et al. |
| 10,479,005 B2 | 11/2019 | Ichiki et al. |
| 10,509,443 B2 | 12/2019 | Honma et al. |
| 10,532,498 B2 | 1/2020 | Takano et al. |
| 10,584,218 B2 | 3/2020 | Mitsutsuji et al. |
| 10,619,017 B2 | 4/2020 | Mitsutsuji et al. |
| 10,675,787 B2 | 6/2020 | Hattori et al. |
| 10,773,472 B2 | 9/2020 | Takano et al. |
| 10,843,437 B2 | 11/2020 | Okunaka |
| 10,870,452 B2 | 12/2020 | Hogger |
| 10,882,224 B2 | 1/2021 | Fujioka et al. |
| 10,919,259 B2 | 2/2021 | Ishikawa et al. |
| 10,960,612 B2 | 3/2021 | Ikeda et al. |
| 10,967,585 B2 | 4/2021 | Giaraffa et al. |
| 10,994,501 B2 | 5/2021 | Duan et al. |
| 10,994,510 B2 | 5/2021 | Takebe et al. |
| 11,015,047 B1 | 5/2021 | Yoshihiro et al. |
| 11,072,098 B2 | 7/2021 | Fujioka et al. |
| 11,136,442 B2 | 10/2021 | Watari et al. |
| 11,142,020 B2 | 10/2021 | Christensen et al. |
| 11,203,136 B2 | 12/2021 | Hirawaki et al. |
| 11,312,090 B2 | 4/2022 | Kaji et al. |
| 11,572,124 B2 | 2/2023 | Bosworth et al. |
| 2002/0017745 A1 | 2/2002 | Vorenkamp et al. |
| 2006/0038375 A1 | 2/2006 | Parkin |
| 2007/0090684 A1 | 4/2007 | Jager |
| 2007/0194619 A1 | 8/2007 | Colegrove et al. |
| 2009/0212530 A1 | 8/2009 | Sasnowski et al. |
| 2009/0277579 A1 | 11/2009 | Marelli et al. |
| 2010/0086727 A1 | 4/2010 | Katayama et al. |
| 2012/0264536 A1 | 10/2012 | Yashiki |
| 2013/0036693 A1 | 2/2013 | Lee et al. |
| 2013/0181423 A1 | 7/2013 | Yu |
| 2014/0037888 A1 | 2/2014 | O'Reilly et al. |
| 2014/0159336 A1 | 6/2014 | Yu |
| 2014/0191492 A1 | 7/2014 | Al-Sheyyab et al. |
| 2014/0352036 A1 | 12/2014 | Ballarin |
| 2015/0047856 A1 | 2/2015 | Buyaert et al. |
| 2015/0119482 A1 | 4/2015 | Kumar et al. |
| 2015/0151464 A1 | 6/2015 | Takano et al. |
| 2015/0314553 A1 | 11/2015 | Desjoyeaux et al. |
| 2016/0082650 A1 | 3/2016 | Carson, Jr. et al. |
| 2017/0226674 A1 | 8/2017 | Jerez |
| 2017/0297278 A1 | 10/2017 | LeCursi et al. |
| 2018/0186085 A1 | 7/2018 | Oeschlegel et al. |
| 2018/0264756 A1* | 9/2018 | Giaraffa .................. B32B 27/34 |
| 2018/0270967 A1 | 9/2018 | Honma et al. |
| 2020/0171763 A1 | 6/2020 | Escowitz et al. |
| 2020/0346441 A1 | 11/2020 | Seike et al. |
| 2020/0347193 A1 | 11/2020 | Hirata et al. |
| 2020/0369838 A1 | 11/2020 | Koshi et al. |
| 2021/0154954 A1 | 5/2021 | Giaraffa et al. |
| 2021/0162638 A1 | 6/2021 | Takahashi et al. |
| 2021/0213691 A1 | 7/2021 | Fujita et al. |
| 2021/0284269 A1 | 9/2021 | Hu et al. |
| 2022/0307569 A1 | 9/2022 | Stanish et al. |
| 2022/0371260 A1 | 11/2022 | Bosworth et al. |

FOREIGN PATENT DOCUMENTS

| | | |
|---|---|---|
| JP | H04-314682 | 10/1992 |
| JP | H11-343407 | 12/1999 |
| JP | 2000-238152 | 9/2000 |
| JP | 2000-309060 | 11/2000 |
| JP | 2005-297417 | 10/2005 |
| JP | 2006-044261 | 2/2006 |
| JP | 2006-076060 | 3/2006 |
| JP | 2007-254718 | 10/2007 |
| JP | 2007-313778 | 12/2007 |
| JP | 2008-230238 | 10/2008 |
| JP | 2012-018797 | 1/2012 |
| JP | 2012-051239 | 3/2012 |
| JP | 2014-172241 | 9/2014 |
| JP | 2015-039842 | 3/2015 |
| JP | 2015-131394 | 7/2015 |
| JP | 2015-217626 | 12/2015 |
| JP | 2016-083875 | 5/2016 |
| JP | 2016-107485 | 6/2016 |
| JP | 2016-188290 | 11/2016 |
| JP | 2016-215483 | 12/2016 |
| JP | 2016-221970 | 12/2016 |
| JP | 2018-001464 | 1/2018 |
| JP | 2018-168704 | 11/2018 |
| JP | 2019-151248 | 9/2019 |
| JP | 2019-171739 | 10/2019 |
| JP | 2019-171796 | 10/2019 |
| JP | 2020-029534 | 2/2020 |
| JP | 2020-082429 | 6/2020 |
| JP | 2021-066143 | 4/2021 |
| JP | 2021-133639 | 9/2021 |
| JP | 2021-142671 | 9/2021 |
| WO | WO 2004/074010 | 9/2004 |
| WO | WO 2015/095966 | 7/2015 |
| WO | WO 2021/224460 | 11/2021 |

OTHER PUBLICATIONS

"0/90 Degree Carbon Fiber Uni Sheet ~ 1/16" x 6" x6"" DragonPLate™, 2017, 2 pages [retrieved online from: dragonplate.com/ecart/product.asp?pID=4879&cID=139].

"DragonPlate Carbon Fiber Laminate FAQ," DragonPlate™, 2017, 2 pages [retrieved online from: dragonplate.com/faq.asp].

International Search Report and Written Opinion for International (PCT) Patent Application No. PCT/US2022/019490, dated Jun. 15, 2022, 12 pages.

Official Action for U.S. Appl. No. 17/690,179, dated Sep. 16, 2022, 10 pages.

(56) References Cited

OTHER PUBLICATIONS

Notice of Allowance for U.S. Appl. No. 17/690,179, dated Nov. 8, 2022, 7 pages.

* cited by examiner

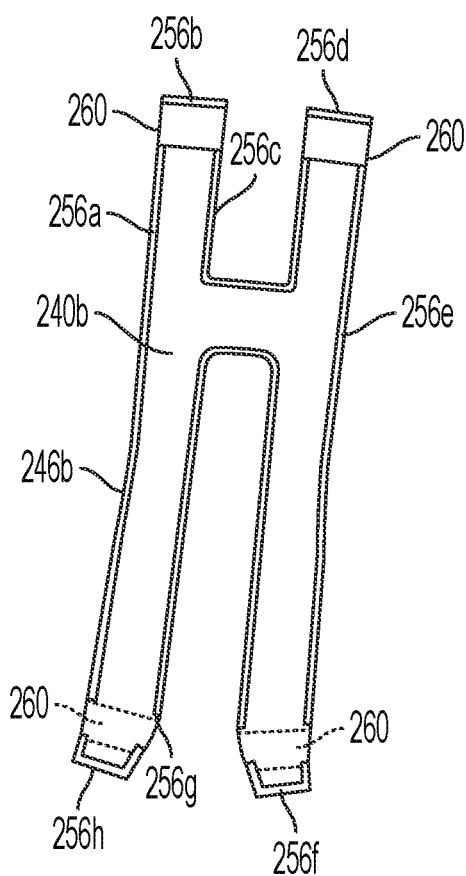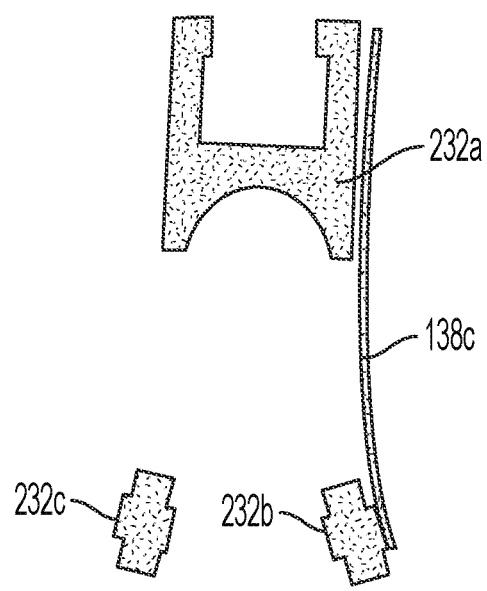
FIG. 16A
FIG. 16B

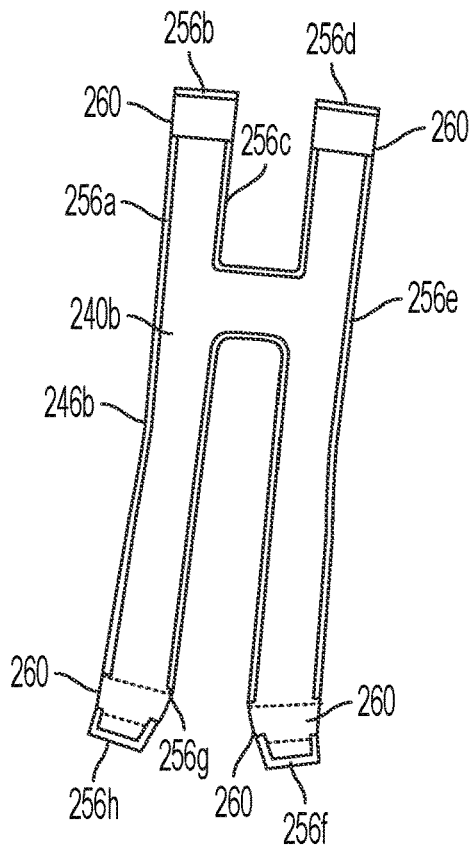
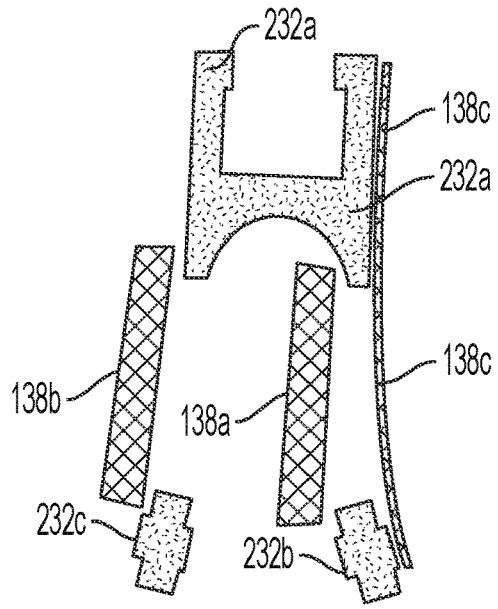
FIG. 18A
FIG. 18B
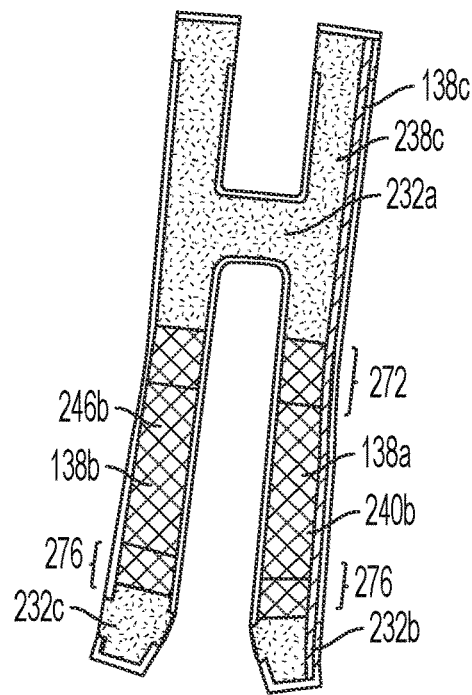
FIG. 18C

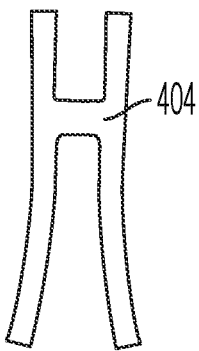
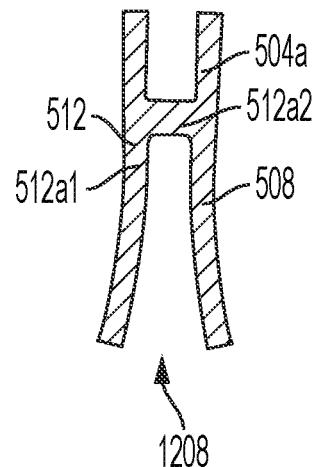
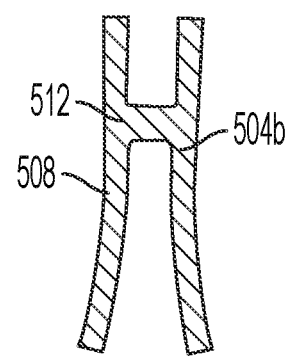
FIG. 21  FIG. 22  FIG. 23
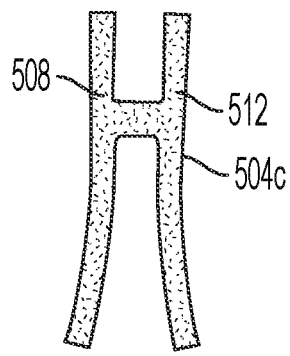
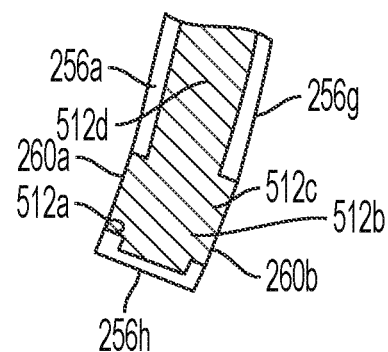
FIG. 24  FIG. 25

COMPOSITE STRUCTURES AND METHODS OF FORMING COMPOSITE STRUCTURES

CROSS-REFERENCE TO RELATED APPLICATIONS

This application is a continuation of U.S. patent application Ser. No. 17/690,179, filed Mar. 9, 2022, which claims the benefit of U.S. Provisional Patent Application Ser. No. 63/158,703, filed Mar. 9, 2021, the entire disclosures of which are hereby incorporated herein by reference.

FIELD

The present disclosure provides composite structures and methods of forming composite structures.

BACKGROUND

Composite materials have a variety of advantages as compared to alternate materials, such as steel, aluminum, or wood. For example, composite materials can be used to form structures having intricate shapes, allowing strength and aesthetics to be optimized. In addition, the potential strength to weight ratio of structures formed using carbon fiber composites is very high. Products formed from carbon fiber composites, commonly referred to as simply "carbon fiber", are also popular with consumers.

Widespread adoption of composite materials has been limited by the relatively high cost of forming composite or carbon fiber structures. These costs are a result of various factors, such as the cost of the materials themselves, and the labor-intensive processes used to form such structures. For example, composite structures are typically formed by laying multiple sheets of composite material in a mold. Each sheet includes fibers that are oriented along one or several directions or plies, and that generally extend from one edge of the sheet to another. More particularly, different layers of material, having the associated ply or plies oriented in a specific direction, are placed in a mold and set into a final form using a two-part epoxy. In addition to being time-consuming and labor-intensive, such techniques are prone to defects when used to form complex, hollow structures time efficiently. Such methods are also unable to take full advantage of the strength to weight ratio of the material. For example, conventional composite structures that are otherwise capable of withstanding designed loads require additional reinforcement in order to provide consumer friendly end products that are resistant to impacts and that have acceptable product lifetimes. In addition, composite structures have typically used thermoset materials that are relatively brittle and difficult to recycle.

As an alternative to composite structures that are formed by layering multiple sheets of material in a mold, structures can be formed relatively quickly and cheaply using injection molding. However, the structures formed using such processes are typically quite weak. In addition, it is impossible to form certain three-dimensional shapes using injection molding.

SUMMARY

Embodiments of the present disclosure provide composite structures and methods of forming composite structures. In accordance with at least some embodiments of the present disclosure, the composite structures can include one or more composite panels or preforms that each include one or more sheets of fiber reinforced thermoplastic material. The composite structures can include at least portions that are hollow. Each composite panel in a composite structure can be joined to at least one other composite panel by a welding or fusing process. In accordance with further embodiments of the present disclosure, a composite structure is provided that includes composite inserts, for example in the form of solid composite structures or block members, or in the form of braided sleeves. In accordance with at least some embodiments of the present disclosure, the composite block members can be configured as shaped core or spacing elements that include reinforcing fibers and thermoplastic material, and can be disposed between at least portions of one or more composite panels. The composite block members can also be provided as separate integral composite structures. Braided sleeves in accordance with embodiments of the present disclosure can be configured as a seamless sleeve of braided reinforcing fibers and thermoplastic threads. A braided sleeve or sleeves can be placed in interior sections or portions of composite panels or preforms. An exterior surface of the braided sleeve can be in contact with interior surfaces of the composite panels. In addition, a braided sleeve can bridge seams or joints between two or more composite panels. A composite structure as disclosed herein can include various combinations of composite panels, composite block members, and braided sleeves.

In accordance with embodiments of the present disclosure, each composite panel comprises one or more composite sheets of material that include a plurality of fibers embedded in a thermoplastic material. In accordance with at least some embodiments of the present invention, at least one of the sheets of material in a composite panel includes fibers that are randomly oriented. Moreover, the randomly oriented fibers may be relatively short, such that most of the fibers do not extend from one edge of the sheet to another. Alternatively or in addition, at least one of the sheets of material in a composite panel includes unidirectional fibers, with at least most of the fibers extending between different edges of the sheet of material. The composite panel can additionally include one or layers of core or spacer material between otherwise adjacent sheets of material. The core or spacer material can be provided as shaped composite blocks. Each of the composite blocks can be in the form of shaped fiber reinforced thermoplastic material. In accordance with at least some embodiments of the present invention, the composite panel includes at least one slit or aperture that is within a perimeter of the composite panel. In accordance with still further embodiments of the present disclosure, the slit or aperture extends through all of the sheets making up the composite panel.

A composite structure as disclosed herein can incorporate multiple composite components. The composite components can include one or more composite panels, composite blocks, braded sleeves, or combinations of composite panels, braided sleeves, and composite blocks. In accordance with at least some embodiments of the present disclosure, a composite structure includes a three-dimensional composite structure component that includes at least one composite panel that is joined to a second composite structure component that includes at least one composite panel. The second composite structure component can also be formed in three dimensions. Together, first and second composite structure components can define interior volumes. Composite blocks and/or braided sleeves can occupy a portion or an entirety of an interior volume. In addition, each of the composite structure components, and the resulting composite structure, can have an aperture formed within an outer perimeter thereof. In accordance with still other embodiments of the present disclosure, the composite structure components can have an open aperture or cut out portion.

Composite structures can also feature at least one hollow section. In accordance with further embodiments of the present disclosure, a volume defined by a hollow section in one or more composite structure components can be occupied by one or more composite blocks and/or one or more braided sleeves. For example, a composite block can be shaped to match contours of interior surfaces of a volume defined by one or more composite panels that is at least partially occupied by the composite block, and an exterior surface of a braided sleeve can be partially or entirely in contact with interior surfaces of a volume defined by one or more composite panels. In a structure that includes composite panels, composite blocks, and braided sleeves as discussed herein, a braided sleeve can extend between a pair of the composite blocks, with all or portions of the composite blocks and the braided sleeve within an interior volume defined by the composite panels. The individual components of a composite structure that includes at least two of a composite panel, a composite block, or a braided sleeve can be one joined to one another by welding or fusing the components to one another.

Methods of forming composite panels can include layering multiple composite sheets of thermoplastic impregnated fiber materials, and fusing the multiple sheets using heat and pressure. The different sheets can be selected to provide fibers of a desired tensile strength, length, and orientation or orientations relative to the perimeter of the respective sheet. In addition, the sheets can be oriented with respect to one another to provide strength in desired directions.

Methods of forming composite blocks can include layering multiple composite sheets of fiber reinforced thermoplastic material, injection molding fiber reinforced thermoplastic material, or compression molding fiber reinforced thermoplastic material. In accordance with at least some embodiments of the present disclosure, the fiber reinforced thermoplastic material is sourced as waste stock created through the shaping or forming of composite structures. Where the composite block is formed by a layering process, pieces of thermoplastic reinforced sheets can be sized and stacked to at least approximate a desired three-dimensional shape. The stack can then be heated to fuse the layers to one another, forming an integral block of composite material. Where the composite block is formed by injection or compression molding, the waste stock can be processed by a chipping or mulching operation, to reduce the length of included fibers. For injection molding, the waste stock is selected or processed so that the length of the included fibers is relative short (e.g. less than 6 mm), and is then heated and injected into a mold. For compression molding, the waste stock is heated and formed in a mold. Moreover, in a compression molding process, the waste stock can be processed so that the included fibers are randomly oriented in the finished composite block. After any of the aforementioned processes, the composite block can be shaped by trimming, sanding, or the like, to obtain a final shape.

A braided sleeve in accordance with embodiments of the present disclosure can include a mixture of a plurality of carbon fiber or other reinforcing fibers and a plurality of fibers formed from or including a thermoplastic material that are woven into a seamless, tubular sleeve. Methods of forming composite structures in accordance with embodiments of the present disclosure that include a braided sleeve include placing an exterior of a braided sleeve against a surface of a composite panel or block. In accordance with at least some embodiments of the present disclosure, some or all side exterior surfaces of a braided sleeve are in contact with an interior surface of one or more composite panels. The ends of the fibers forming the braided sleeve can also be placed in contact with a composite block or with a surface of a composite panel.

Methods of forming composite structures in accordance with embodiments of the present disclosure include placing a composite panel in a female mold and applying pressure to the composite panel with a male mold, to form a three-dimensional composite structure component. The composite panel can have a slit or aperture formed therein prior to placing the panel in the molds. A first three-dimensional composite structure component can be joined to a second three-dimensional composite structure component to form a completed composite structure. In accordance with further embodiments, the composite structure can include more than two composite structure components. In accordance with further embodiments of the present disclosure, composite inserts such as composite blocks and braided sleeves as disclosed herein are incorporated into composite structures that also include one or more composite panels. More particularly, composite blocks can be positioned such that they contact a surface of a composite panel. A braided sleeve can be pressed against interior surfaces of a volume defined by composite panel or panels by a bladder or mandrel that is positioned within an interior of the braided sleeve, such that the exterior surface of the braided sleeve is in contact with and conforms to the adjacent surface of the composite panels. Moreover, an entire exterior surface of a braided sleeve can thus be placed in contact with a surface of the volume defined by the composite panels. The entire composite structure can be heated to fuse the components to one another, creating an integral structure. Moreover, multiple components of a composite structure, including composite panels, composite blocks, and/or braided sleeves, can be fused to one another in a single operation.

Moreover, at least some of the composite structure components can be flat, rather than formed in three dimensions. The composite structure can include an aperture within or through an outside perimeter of the structure that extends through multiple composite structure components. Alternatively or in addition, the composite structure can include one or more hollow portions formed between opposing sections of composite structure components. In accordance with further embodiments of the present disclosure, a composite block can be shaped to occupy a volume between opposing sections of composite structure components.

Methods of joining composite structure components include welding or fusing composite structure components, including composite panels and composite blocks, to one another. Welding components can include applying heat to the area of the joint, to raise the temperature of the components to a point that is greater than the glass transition temperature and up to, at, or greater than the melt temperature of the thermoplastic material. In accordance with at least some embodiments of the present disclosure, a joint between adjacent composite structure components is formed by abutting edges of the adjacent components. In addition, a welding strip, which can be a strip of the same thermoplastic material present in the composite structure components, with or without fibers, can be placed along the joint while heat is applied to the joint. In accordance with still further embodiments of the present disclosure, the welding strip can be located within a hollow area of the composite structure, and can be pressed against the composite structure components that are being joined by an inflated bladder, a mandrel, or the like, while heat is being applied to form the joint. In accordance with some embodiments of the present disclosure, a braided sleeve can be located so as to extend along a joint between composite structure components, and can take the place of or can be provided in addition to a welding strip. In accordance with still other embodiments of the present disclosure, a joint between adjacent composite structures is formed by overlapping edges of the adjacent components. Moreover, a joggle or step can be formed in one or both components to enable a smooth exterior (or interior) surface.

Additional features and advantages of embodiments of the present disclosure will become more readily apparent from the following description, particularly when considered together with the accompanying drawings.

BRIEF DESCRIPTION OF THE DRAWINGS

FIGS. 16A-16D depict components of a variant of the composite structure of FIGS. 13 and 14;

FIGS. 18A-18C depict components of another variant of the composite structure of FIGS. 13 and 14;

FIG. 21 depicts a composite panel in accordance with embodiments of the present disclosure;

FIGS. 22-24 depict sheets of fiber reinforced thermoplastic material in accordance with embodiments of the present disclosure in top plan views;

FIG. 25 depicts a portion of a composite structure in accordance with embodiments of the present disclosure in a top plan view;

DETAILED DESCRIPTION

Figure 1:
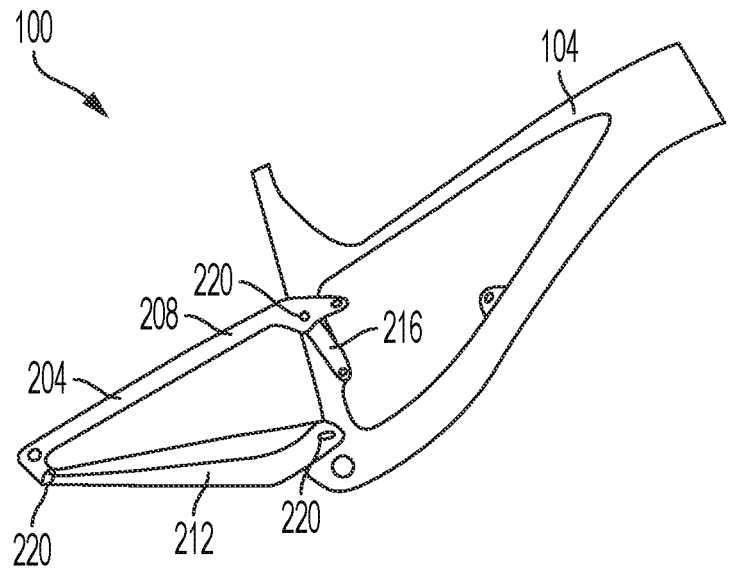
FIG. 1 depicts an example of an assembly incorporating multiple interconnected composite structures in accordance with embodiments of the present disclosure in a side elevation view.

FIG. 1 depicts an example of an assembly 100 incorporating multiple interconnected composite structures in accordance with embodiments of the present disclosure. In general, the assembly 100 includes a main frame 104 and a swingarm assembly 204. The swingarm assembly 204 includes a pair of seat stays 208 and a chain stay assembly 212. In addition, in the illustrated example, the assembly 100 includes a link element or member 216 between the chain stays 208 and the mainframe 104. The various components of the assembly 100 can be connected to one another by pivot point assemblies 220, to allow the components to move relative to one another in a controlled fashion. Accordingly, in this example, the assembly 100 includes at least portions of a bicycle frame. However, it should be appreciated that embodiments of the present disclosure are not limited to bicycle frames or other bicycle components.

Figure 2:
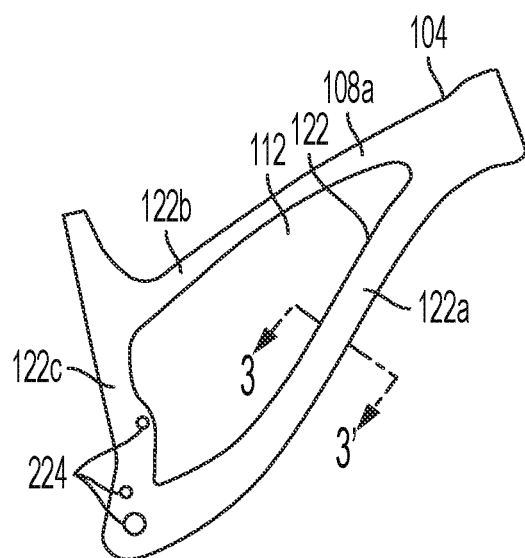
FIG. 2 depicts an example of a composite structure incorporating multiple composite components in accordance with embodiments of the present disclosure in a side elevation view.

FIG. 2 depicts an exemplary composite structure 104, in this example the main frame of a bicycle, incorporating multiple composite components in accordance with embodiments of the present disclosure. The composite structure 104 includes a closed aperture 112 generally formed between adjacent portions or surfaces 122 of the structure 104, here generally corresponding to a downtube portion 122a, a top tube portion 122b, and a seat tube portion 122c of the frame. In accordance with embodiments of the present disclosure, and as discussed in greater detail elsewhere herein, some or all of the various portions 122a-c can be in the form of hollow composite structures that include a plurality of composite components. In addition, holes or apertures 224 can be formed in the composite structure 104, for example at locations corresponding to pivot points 220, or other structural features, such as mounting points or through holes for connecting other components or accessories.

Figure 3A:
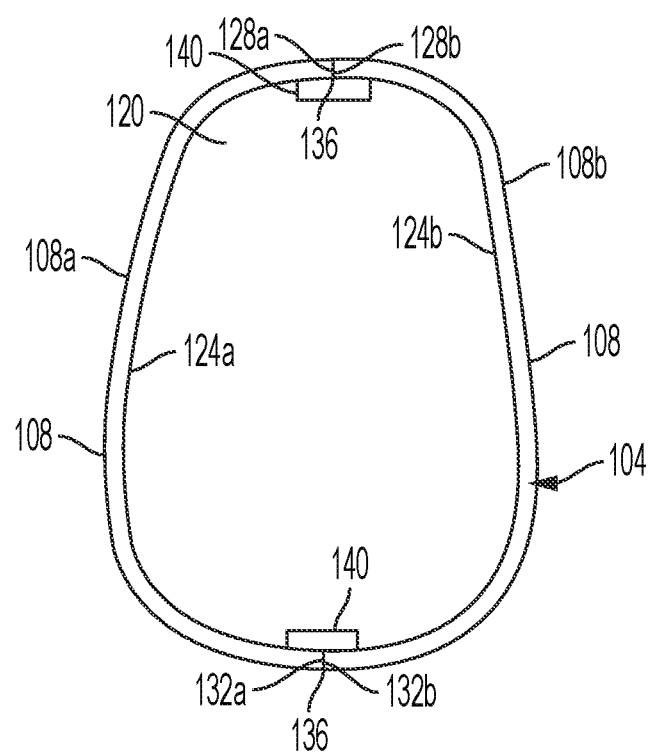
FIG. 3A depicts a cross-section of a variant of a composite structure of taken along line 3-3' of FIG. 2.
Figure 3B:
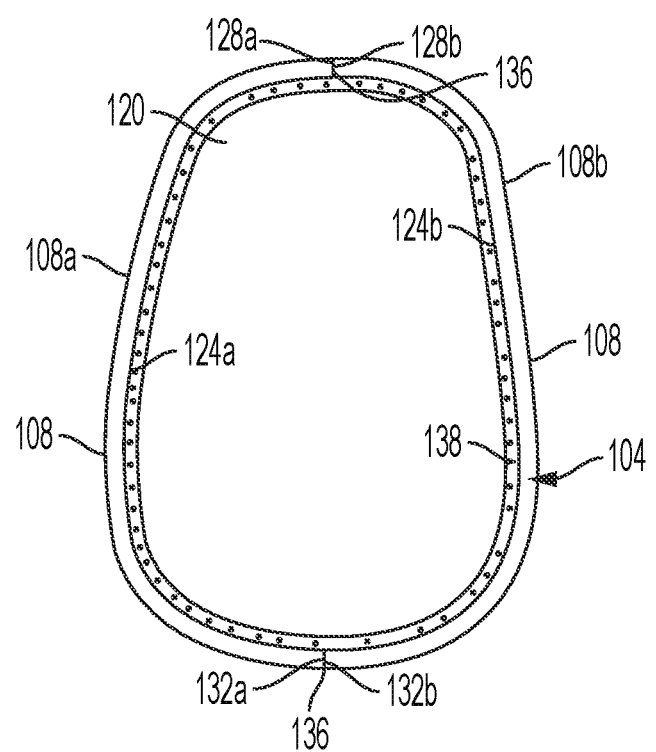
FIG. 3B depicts a cross-section of another variant of a composite structure along line 3-3' of FIG. 2.

FIGS. 3A and 3B depict variants of the composite structure 104 in a cross-section taken along line 3-3' in FIG. 2. In this example, the composite structure is a main portion of a bicycle frame. However, it should be appreciated that other products comprising unitary or multipart structures can be formed using embodiments of the present disclosure. In particular, composite structures 104 as disclosed herein can be used to form all or portions of various products, including products having complex shapes, a high-strength to weight ratio, and excellent impact resistance. Moreover, as described herein, composite structures 104 can be formed with reduced costs, including reduced labor and production costs, and with reduced manufacturing time, as compared to conventional composite structures 104.

The example composite structure 104 is formed using multiple composite structures or component parts 108a and 108b (see FIGS. 3A and 3B), and includes an aperture 112 within the component parts 108 (see FIG. 2) formed within an outside perimeter of the composite structure 104. The composite structure components 108 are formed in three dimensions, and when joined create a hollow space or interior volume 120 between adjacent interior portions or surfaces 124a and 124b of the components 108. In addition, the composite structure components 108 are joined to one another along corresponding inside edge portions 128a and 128b and outside edge portions 132a and 132b. In accordance with at least some embodiments of the present disclosure, the respective inside edge portions 128a and 128b and outside edge portions 132a and 132b are welded or fused to one another, forming a welded joint 136. In accordance with at least some embodiments of the present disclosure, and as illustrated in FIG. 3A, a welding strip 140 can be provided adjacent to some or all of the joints 136.

In accordance with further embodiments of the present disclosure, and as illustrated in FIG. 3B, a composite insert in the form of a braided tube or sleeve 138 can be disposed within the interior volume 120, between the interior surfaces 124a and 124b of the components 108. In such embodiments, the braided sleeve 138 can be provided in place of a welding strip. In addition, the braided sleeve 138 in such embodiments can function as an additional structural member or layer, and thus adjacent or surrounding structural components can be provided in a reduced thickness than if the braided sleeve 138 were not present. In accordance with embodiments of the present disclosure, a braided sleeve 138 can include a seamless structure having a plurality of reinforcing fibers and a plurality of thermoplast threads woven together to form a flexible, tubular structure. Moreover, in at least some embodiments, the braided sleeve 138 is flexible, and has a diameter that can be varied by some amount from a nominal diameter, at least prior to welding or fusing the braided sleeve to an interior surface 124 of a composite structure component or components 108. Accordingly, a braided sleeve 138 can be placed in contact with most or all of the surfaces of an interior volume 120, even where the dimensions of the interior volume vary or are irregular. In accordance with still other embodiments, a composite structure 104 can include both a welding strip 140 and a braided sleeve 140. For instance, a welding strip 140 can be provided that overlays the seams between adjacent edge portions 128a-b, another welding strip 130 can be provided that overlays the seams between adjacent edge portions 132a and 132b, and a braided sleeve 138 can be provided such that an outer surface of the braided sleeve contacts surfaces of the welding strips 140 that are not in contact with the interior surfaces 124a and 124b of the components 108 and further contacts surfaces 124a and 124b that are not covered by welding strips 140 or other components. As another example, a welding strip 140 can extend along a portion of a length of a joint between the components 108, and a braided sleeve 138 can extend along another portion of the length of the joint between the components 108. Although the components 108a and 108b are shown joined along a butt joint, alternative or additional joint types, such as but not limited to overlap or joggle type joints can be used, alone or in combination with welding strips 140, one or more braided sleeves 138, or both welding strips 140 and braided sleeves 138.

Each composite structure component 108 may, for example, comprise one half of the completed composite structure 104. In addition, the first composite structure component 108a and the second composite structure component 108b may mirror one another. However, such a configuration is not a requirement. In addition, a composite structure 104 can include any number of composite structure components 108. Moreover, a single composite structure component 108 can be joined to multiple other composite structure components 108.

Figure 4A:
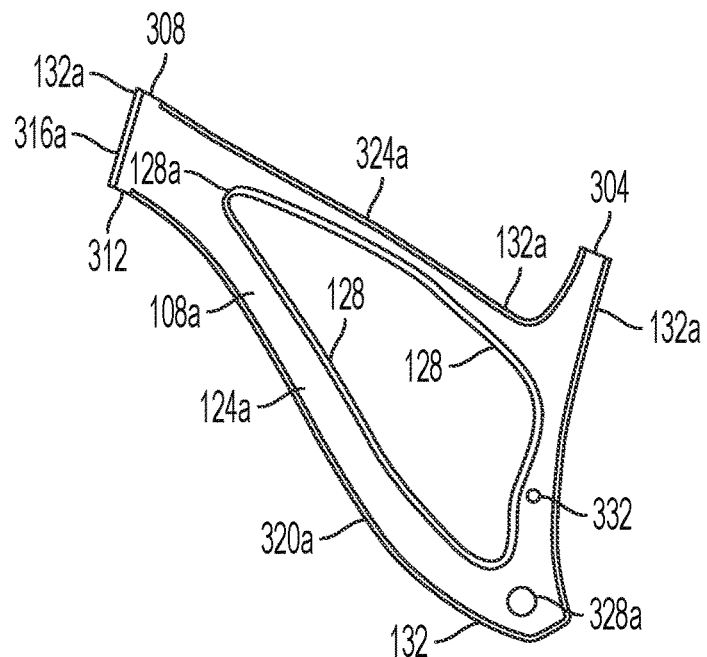
FIGS. 4A-4B depict composite structure components in accordance with embodiments of the present disclosure.
Figure 4B:
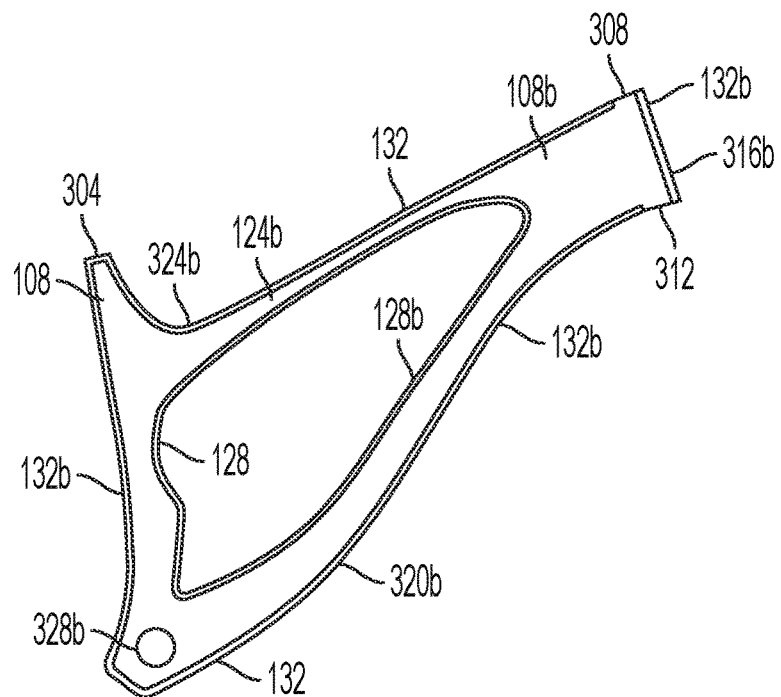

With reference now to FIGS. 4A-4B, example composite structure components 108 are shown in a plan view looking at the interior surfaces 124a and 124b of the respective components 108a and 108b. More particularly, FIG. 4A illustrates the inside surface 124a, the inside edge portions 128a, and the outside edge portions 132a of the first composite structure component 108a, while FIG. 4B illustrates the inside surface 124b, the inside edge portions 128b, and the outside edge portions 132b of the second composite structure component 108b.

The inside edge portions 128 and/or the outside edge portions 132 can be continuous, or can include discontinuities. Moreover, the inside edge portions 128 and/or the outside edge portions 132, can be provided in multiple sections. The example composite structure components 108 depicted in FIGS. 4A and 4B include continuous inside edge portions 128 that define a closed aperture 112 in the frame or composite structure 104. The example composite structure components 108 additionally feature outside edge portions 132 that include discontinuities. In particular, a first discontinuity is present in an area corresponding to a seat post aperture 304, and second and third discontinuities are present in areas corresponding to the top 308 and bottom 312 of a head tube portion of the composite structure 104. As a result of this configuration, the outside edge portions 132 of the example composite structure components 108 are provided in multiple sections: a first section 316a and 316b between the top 308 and bottom 312 of the head tube portion, a second section 320a and 320b between the bottom 312 of the head tube portion and the seat post aperture 304, and a third section 324a and 324b between the seat post aperture 304 and the top 308 of the head tube portion.

In addition, one or more auxiliary apertures can be formed between the inside edge portion 128 and the outside edge portion 132 of one or both of the composite structure components 108. For example, a first auxiliary aperture 328a may be formed in the first composite structure component 108a and a corresponding first auxiliary aperture 328b may be formed in the second composite structure component 108b to accommodate a bottom bracket assembly. As another example, a second auxiliary aperture 332 may be formed in the first composite structure component 108a only, to provide a mounting point for a component or accessory.

Figure 5:
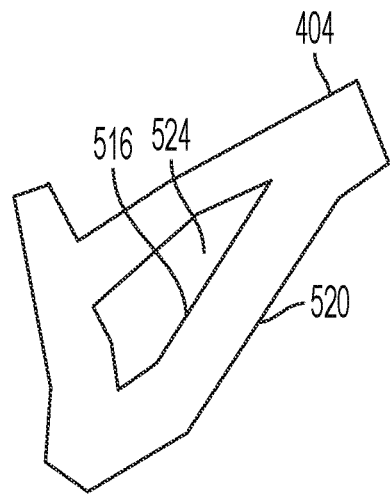
FIG. 5 depicts a composite panel in accordance with embodiments of the present disclosure in a side elevation view.
Figure 6:
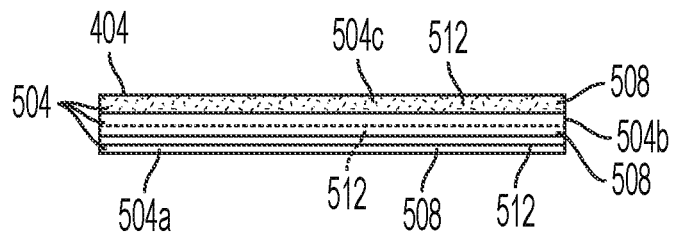
FIG. 6 depicts an example layup of a composite panel in accordance with embodiments of the present disclosure.

In accordance with embodiments of the present disclosure, each composite structure component 108 is formed from a composite panel 404. An example composite panel 404, before the forming process has been performed, is depicted in plan and cross-section views in FIGS. 5 and 6 respectively. As shown, the composite panel 404 may comprise a planar panel prior to molding to form a composite structure component 108. Moreover, as illustrated in FIG. 6, the composite panel 404 generally includes a plurality of composite sheets 504 that have been fused or welded to form the composite panel 404. Each composite sheet 504 can include a thermoplastic material 508 and a plurality of reinforcing fibers 512 embedded therein. The composite sheets 504 are fused to one another through the application of heat and pressure. FIG. 5 depicts a composite panel 404 after trimming of the completed composite panel 404 or the individual sheets 504, to define inside edges 516 and outside edges 520. The inside edges 516 define an aperture 524 in the composite panel 404. Some or all of the inside edges 516 may be coincident with the inside edge or edges 128 of the formed composite structure component 108. In addition, some or all of the outside edges 520 may be coincident with the outside edge or edges 132 of the composite structure component 108. Alternatively, the edges 516 and 520 can approximate the respective edges 128 and 132 of the composite structure component 108. For instance, the edges 128 and 132 of the composite structure component 108 can be formed by trimming after the composite panel 404 has been molded into the three-dimensional shape of the composite structure component 108.

Figure 7:
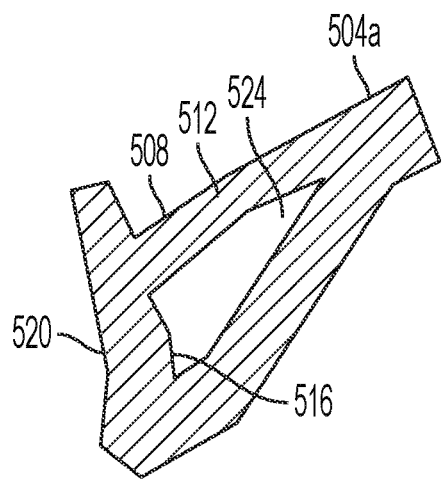
FIG. 7 depicts a sheet of fiber reinforced thermoplastic material in accordance with an embodiment of the present disclosure.
Figure 8:
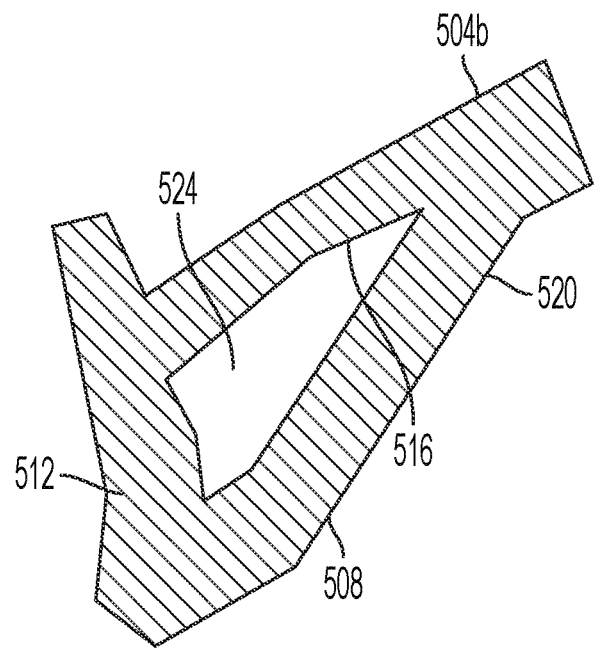
FIG. 8 depicts a sheet of fiber reinforced thermoplastic material in accordance with another embodiment of the present disclosure.
Figure 9:
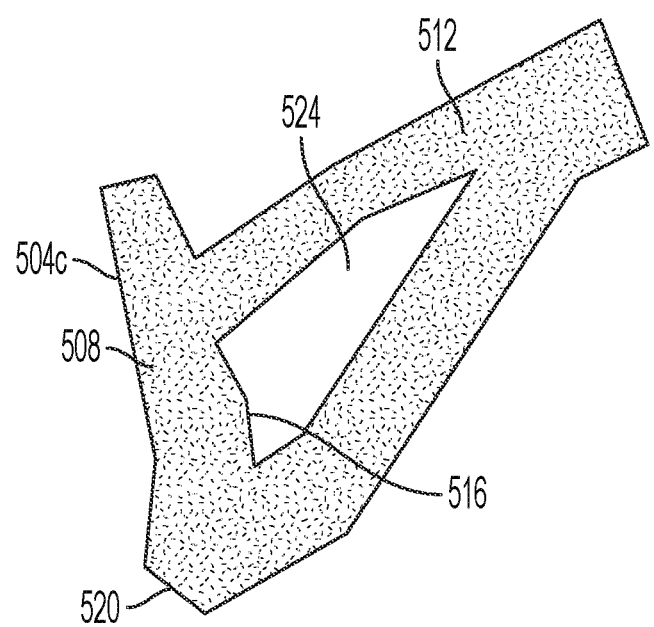
FIG. 9 depicts a sheet of fiber reinforced thermoplastic material in accordance with another embodiment of the present disclosure.

Different composite sheets 504 within a composite panel 404 can have different fiber 512 orientations and configurations, as illustrated in FIGS. 7-9. For example, one or more composite sheets 504 within a composite panel 404 can feature relatively long fibers 512 that can extend between adjacent edges of the sheet 504. Such a configuration is illustrated in FIGS. 7 and 8, with fibers 512 that extend between different outside edges 520, or between an outside edge 520 and an inside edge 516. The composite sheets 504a and 504b with relatively long fibers 512 can have those fibers configured unidirectionally, such that the fibers 512 extend in the same general direction. In accordance with further embodiments, the fibers 512 can be parallel or substantially parallel to one another. As used herein, fibers 512 are substantially parallel if they extend along a common direction +/−10°. Moreover, two or more sheets 504 having relatively long fibers 512 can be aligned such that the fibers 512 of one composite sheet 504 are at a nonzero angle with respect to the fibers 512 of another one of the composite sheets 504. Alternatively or in addition, one or more of the composite sheets 504 can have relatively short, randomly oriented fibers 512. More particularly, the fibers 512 can be randomly oriented in at least a plane encompassing the edges of the composite sheet 504 when that sheet 504 is in a flat configuration. FIG. 9 depicts a composite sheet 504c having randomly oriented fibers 512 embedded within a thermoplastic material 508. As shown, the fibers 512 in this example are relatively short, and generally do not extend between opposite edges 516 and 520 of the composite sheet 504. In accordance with still other embodiments, the fibers 512 within a composite sheet 504 can be woven, with subsets of fibers and selected angles with respect to other subsets of fibers within the composite sheet 504.

In the example layup of sheets 504 within a composite panel 404 illustrated in FIG. 6, a first composite sheet 504a comprising a first layer has relatively long fibers 512 oriented in a first direction, a second composite sheet 504b comprising a second layer has relatively long fibers 512 oriented in a second direction, which in this example is orthogonal to the first direction, and a third composite sheet 504c comprising a third layer has relatively short fibers 512 in random orientations within the thermoplastic material 508. In an exemplary embodiment, the first composite sheet 504a may form an inside surface 124 of a finished composite structure component 108, while the third composite sheet 504c may form an exterior surface of the finished composite structure component 108. In addition, embodiments of the present disclosure can include spacer or filler sheets or layers between sheets 504 containing thermoplastic material 508 and fibers 512. A spacer or filler layer can include various materials, such as but not limited to glass or foam embedded in or impregnated with a thermoplastic material 508.

In accordance with at least some embodiments of the present disclosure, the composite panel 404 is formed as a planar or substantially planar panel from textile-like composite sheets 504. The individual sheets may or may not be flexible at room temperature. Each of the composite sheets 504 may be in the form of a substantially continuous sheet, for example in the shape of a rectangle, that is trimmed to form edges 516 and 520, and one or more apertures 524, before they are initially stacked with one another to form the layup of the composite panel 404. Alternatively, some or all of the composite sheets 504 may be trimmed after being fused to one or more other composite sheets 504. Whether formed in individual or sub-sets of composite sheets 504, or in a completed composite panel 404, the edges 516 and 520 generally follow a pattern that approximates the shape of the composite structure component 108 that will be formed from the composite panel 404. In addition, all or portions of the edges 516 and 520 can include fringes or slots, and one or more apertures 524 can be formed within the outer perimeter of the composite panel 404, to assist in obtaining a desired three-dimensional composite structure component 108 from the composite panel 404.

Figure 10:
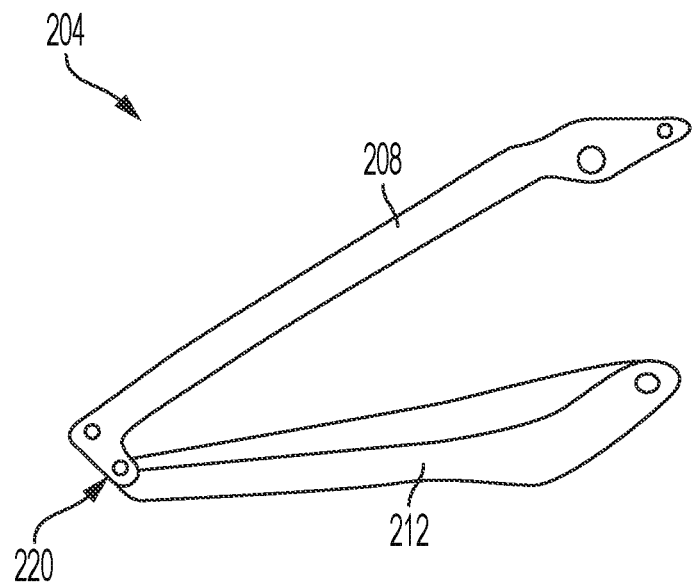
FIG. 10 depicts an example of a sub-assembly incorporating multiple interconnected composite structures in accordance with embodiments of the present disclosure.

FIG. 10 depicts a sub-assembly 204, in this example a swingarm assembly, incorporating multiple interconnected components that include multiple composite structures in accordance with embodiments of the present disclosure. The composite structures of the swingarm assembly 204 in this example include a pair of seat stays 208 and a chain stay structure or assembly 212. The seat stays 208 and chain stay assembly 212 are connected to one another by a pair of pivot point assemblies 220. In accordance with other embodiments of the present disclosure, the entire swingarm assembly 204 can be formed as an integral structure, rather than as multiple structures interconnected by pivots.

Figure 11:
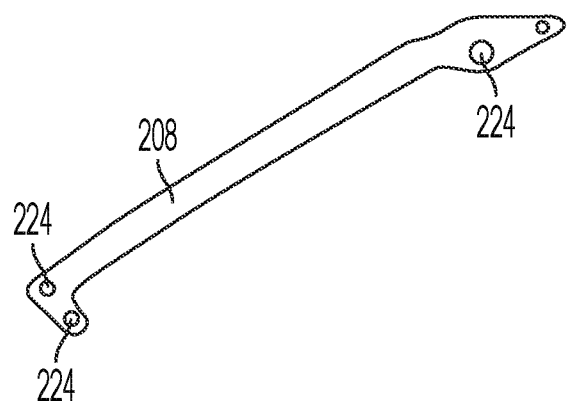
FIG. 11 depicts an example of a composite structure incorporating multiple composite components in accordance with embodiments of the present disclosure.
Figure 12:
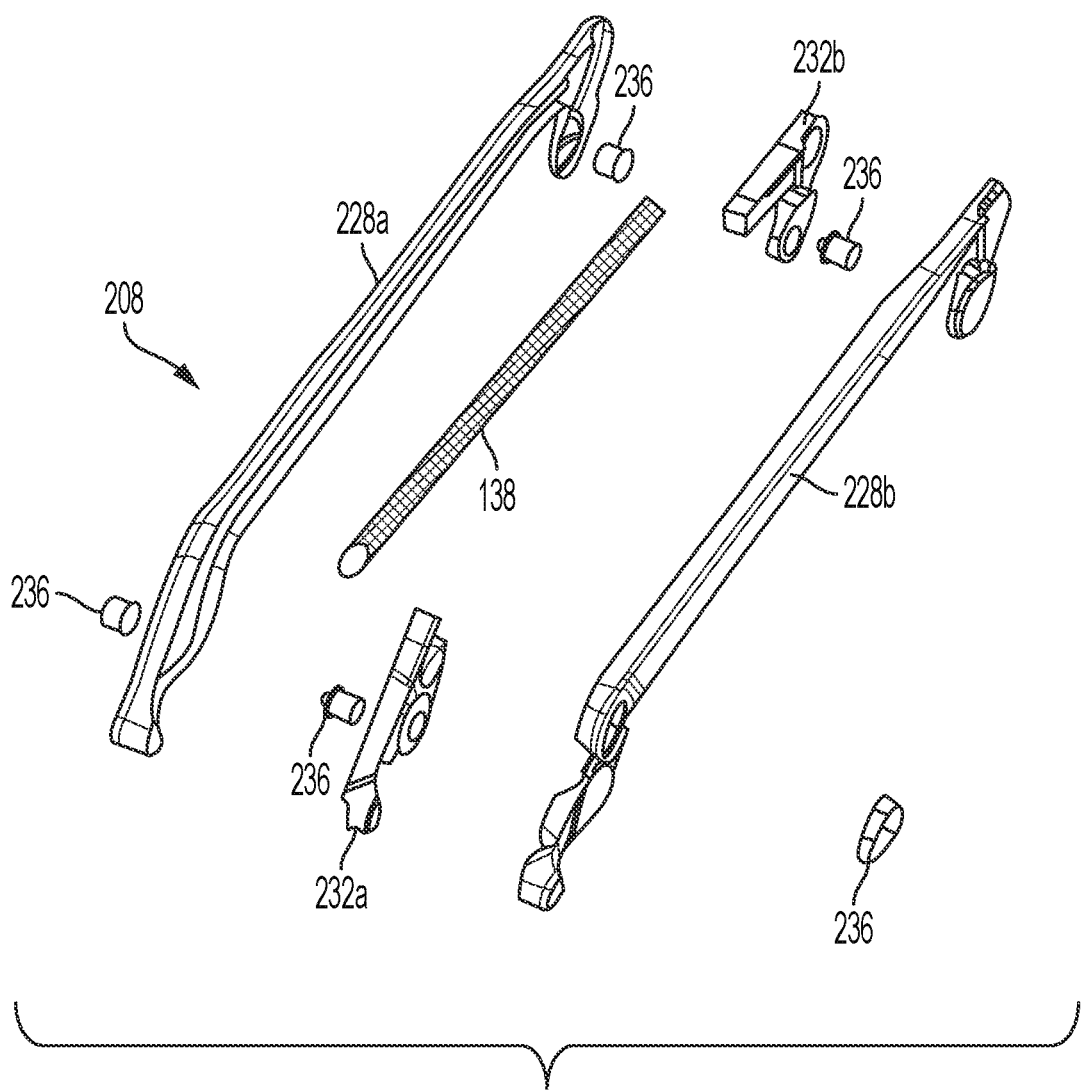
FIG. 12 is an exploded perspective view of the composite structure incorporating multiple composite components of FIG. 11.

FIG. 11 depicts a single seat stay 208, and is another example of a composite structure incorporating multiple composite components in accordance with embodiments of the present disclosure. FIG. 12 is an exploded perspective view of the exemplary composite structure incorporating multiple composite components of FIG. 11. As shown in the exploded view, each seat stay 208 can include a first component part 228a, in this example an outside seat stay portion, and a second component part 228b, in this example an inner seat stay portion. Each component part 228 can itself be a three-dimensional composite structure formed from multiple layers of fiber reinforced thermoplastic material, as described in greater detail elsewhere herein. Various holes or apertures 224 can be formed in the component parts 228, for example to accommodate fasteners, components, or pivot points. In addition, the seat stay 208 can include one or more composite inserts, such as carbon or composite block members 232 and/or braided sleeves 138. As discussed elsewhere herein, composite block members 232 can include solid or substantially solid blocks of thermoplastic or fiber reinforced thermoplastic material formed in a shape that conforms to all or a portion of an interior volume formed between two or more component parts. A braided sleeve 138 can extend along some or all of an interior portion of the seat stay 208, within a volume defined by the component parts 228 for most of a longitudinal extent or length of the seat stay 208. Accordingly, the braided sleeve 138 can function as an additional structural member or layer. As discussed in greater detail elsewhere herein, in this and other embodiments of the present disclosure, an exterior surface of the braided sleeve 138 can conform and can be fused to the interior surface or surfaces of other composite structure components, such as the component parts 228. In addition, a braided sleeve 138 can supplement or can replace a welding strip in an area of a joint or joints between the component parts 228. Moreover, a first end of the braided sleeve 138 can be adjacent or in contact with a block member 232a at or towards a first end of the seat stay 208, and a second end of the braided sleeve can be adjacent or in contact with a block member 232b at or towards a second end of the seat stay 208. In accordance with still further embodiments, the seat stay 208 can include one or more inserts or attachment elements 236, including but not limited to composite, carbon, metallic, ceramic, or plastic attachment elements, for receiving fasteners, forming bearing surfaces, or for forming other elements.

Figure 13:
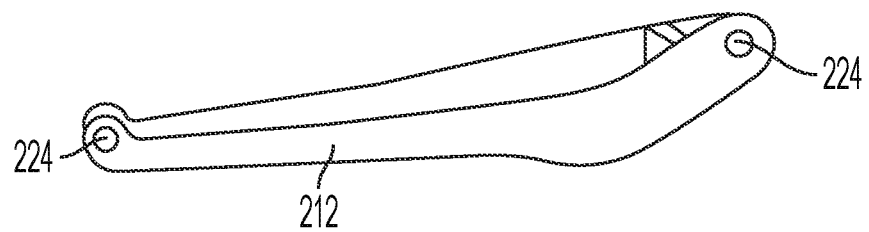
FIG. 13 depicts another example of a composite structure incorporating multiple composite components in accordance with embodiments of the present disclosure.
Figure 14:
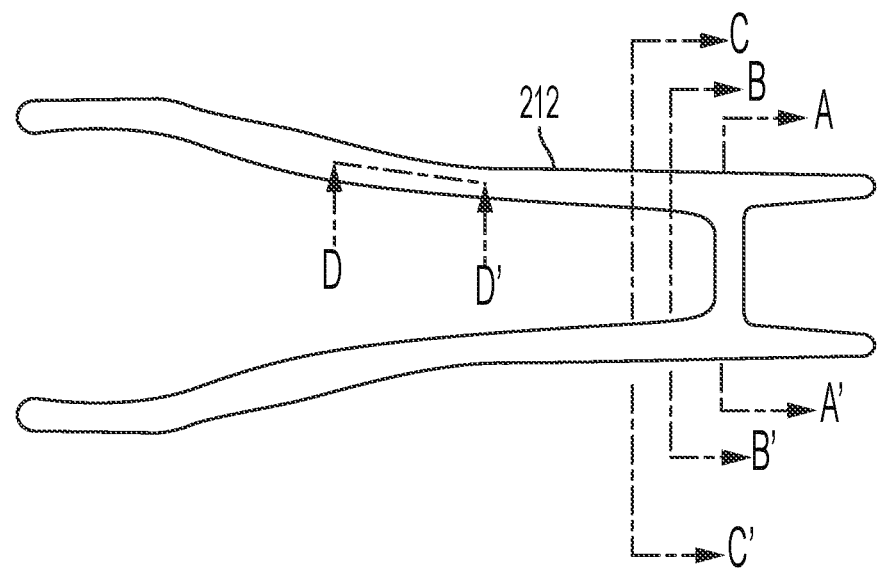
FIG. 14 depicts the composite structure of FIG. 13 in a plan view.
Figure 15:
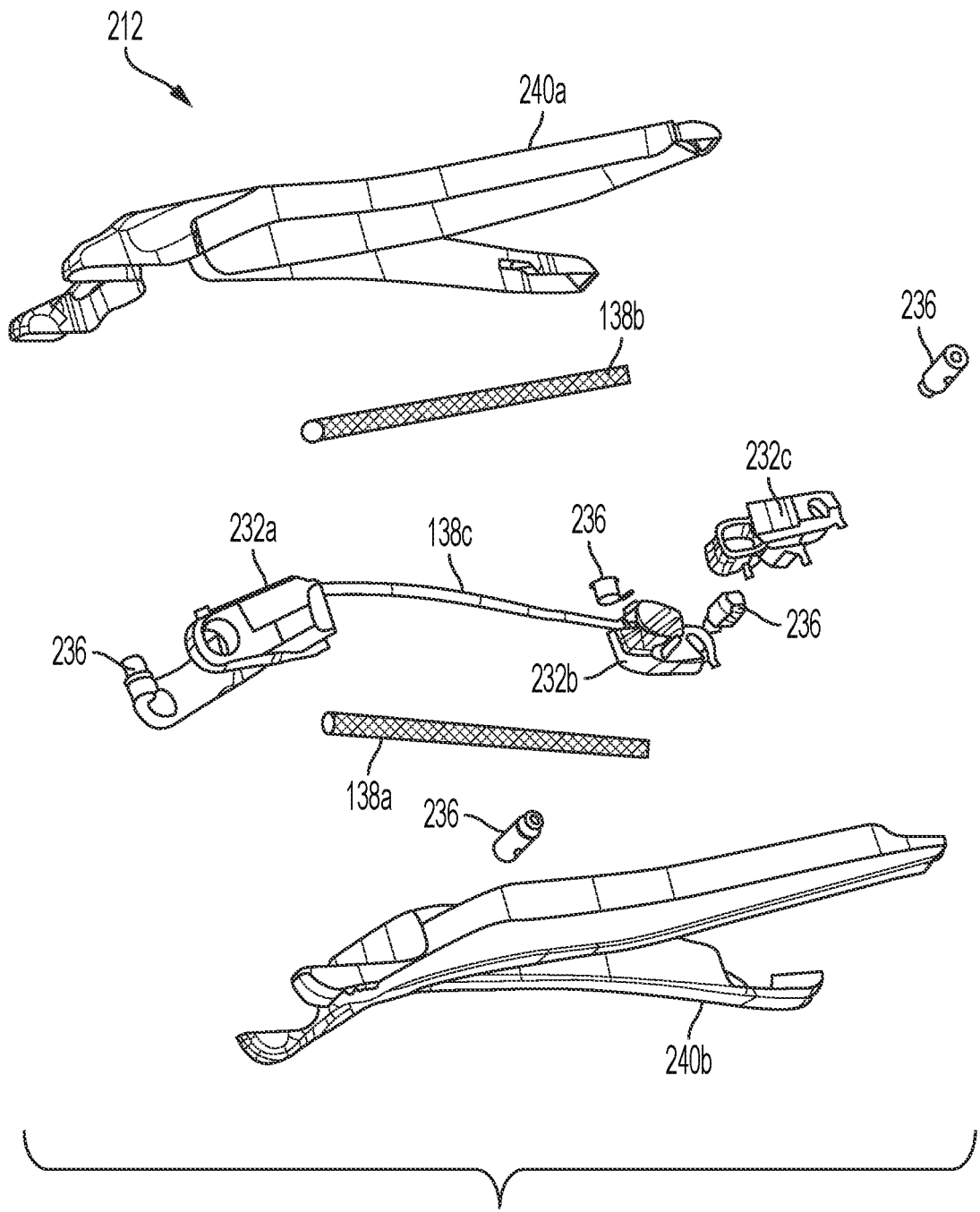
FIG. 15 is an exploded perspective view of the exemplary composite structure incorporating multiple composite components of FIGS. 13 and 14.

FIGS. 13 and 14 are views depicting a chain stay assembly 212, and illustrate another exemplary composite structure incorporating multiple composite components in accordance with embodiments of the present disclosure. FIG. 15 is an exploded perspective view of the chain stay assembly 212 of FIGS. 13 and 14. As shown in this example, the chain stay assembly 212 can include a first component part or composite structure component 240a, in this example in upper chain stay assembly portion, and a second component part or composite structure component 240b, in this example a lower chain stay assembly portion. Each component part 240 can itself be a composite structure, as described in greater detail elsewhere herein. Moreover, the chain stay assembly 212 can include one or more carbon or composite block members 232, one or more braided sleeves 138, and/or one or more attachment elements 236. For instance, a first braided sleeve 138a can be provided within a first (e.g. a drive side) strut or stay portion of the chain stay assembly 212. A second braided sleeve 138b can be provided within a second (e.g. a non-drive side) stay portion of the chain stay assembly 212. Accordingly, the first and second braided sleeves 138a and 138b can function as additional structural elements or layers. As shown in FIG. 15, in addition or as an alternative to integration with one or more component parts 240, a further braided sleeve 138c can be integrated with one or more composite block members 232. For instance, in the illustrated example, a braided sleeve 138c extends along one side of the assembly 212 to provide a passageway or housing that enables a control cable or line to be internally routed through the chain stay assembly 212 between an aperture or stop formed in a first one of the block members 232a and an aperture or stop formed in a second one of the block members 232b. In addition, various fixtures or attachment elements 236 included in the chain stay assembly 212 can be at least partially mounted in or received by holes or apertures that are at least partially formed in the block members 232, whose solid structures are particularly suitable for providing for the secure mounting of such elements in the larger assembly.

Figure 16C:
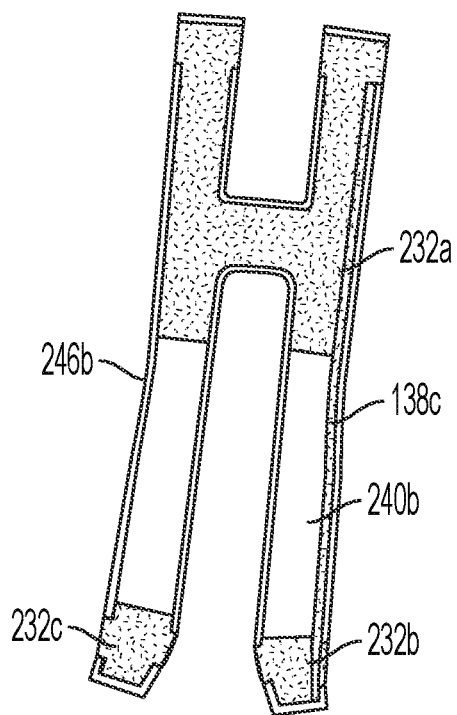

FIGS. 16A-16C depict views of composite structure components, and in particular of portions of a chain stay assembly 212, in accordance with embodiments of the present disclosure. In FIG. 16A, a lower chain stay assembly portion 240b is depicted in a top plan view. As shown, the edge portion 246b is divided into a number of segments, labeled 256a-h in the figure, by discontinuities 260. Each discontinuity can correspond to a hole or aperture 224 in the chain stay assembly 212. FIG. 16B depicts composite block members 232 and a braided sleeve 138 that can be incorporated into the chain stay assembly 212. In this example, three composite block members 232 are shown: a first composite block member 232a that occupies areas of a front pivot point in both left and right chain stay portions and a connecting or bridge portion between the left side and right side chain stay portions; a second composite block member 232b that occupies an area at a rear end of the right side chain stay portion, for example in an area in which attachment elements or integral surfaces for receiving a portion of a rear wheel axel or fastener, for receiving a derailleur, for establishing a pivot point, and/or for receiving or otherwise providing mounting or locating points for other components is located; and a third composite block member 232c that occupies an area at a rear end of the left side chain stay portion, for example in an area in which attachment elements for receiving another portion of the rear wheel axel or fastener, for receiving brake caliper mounting hardware, for establishing a pivot point, or for otherwise providing mounting or locating points for other components is located. In addition, a braided sleeve 138c that can be included to form a guide or housing for a control cable or line is illustrated. FIG. 16C illustrates those composite block members 232 positioned against the interior surface of the lower chain stay assembly portion 240b, and the braided sleeve 138c. Although not shown, additional composite block members 232 and/or braided sleeves 138 can be provided. For example, an additional composite block 232 can be proved in a brake caliper mounting area, and an additional braided sleeve 138 can be provided to receive or form a hydraulic brake line that will connect to the brake caliper.

Figure 16D:
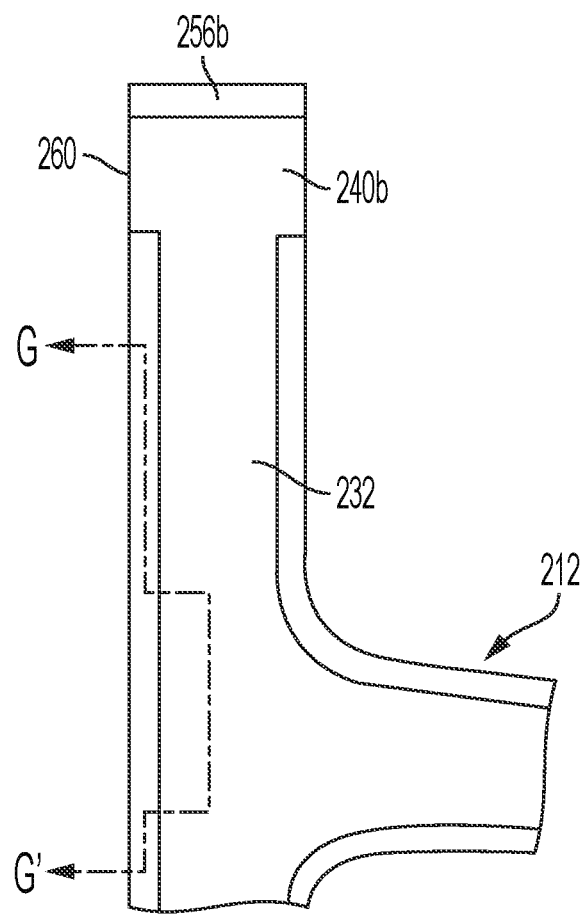

In accordance with embodiments of the present disclosure, a composite block 232 can be formed using various means, including placing layers of thermoplastic 508 fiber 512 reinforced sheets 504 on top of one another to form a rough block having a shape approximating the final shape of the three dimensional composite block 232, and applying heat and pressure to the rough block, for example by placing it in a heated mold, to form the final composite block 232 structure. In such embodiments, the orientation of the reinforcing fibers 512 within the individual sheets 504 used to form the composite block 232 can be selected such that their orientation is nonparallel to a joint or joints, including but not limited to butt joints 244 and overlapping joints 254, in an area of a structure 212 incorporating the composite block 232. Accordingly, the orientation of the fibers 512 in a composite block 232 can be selected to span a joint line between composite panels or components. In accordance with further embodiments of the present disclosure, the fibers 512 in composite sheets 504 forming the interior surfaces of joined composite panels can be parallel to one another and also parallel to fibers 512 in a composite block occupying a volume between the composite panels, at least along and near the joint line. An example of such a configuration is depicted in FIG. 17I, showing a side cross-section view of an interior of an assembly along line G-G' in FIG. 16D, and in particular depicting the orientation of the fibers 512 in the composite block 232 and in the interior sheets forming the interior surfaces 248a and 248b of the composite panels included in the assembly 212. Although components included in a chain stay assembly 212 are used to illustrate this aspect of embodiments of the present disclosure, it should be appreciated that other components and structures can be constructed as discussed herein.

Figure 17A:
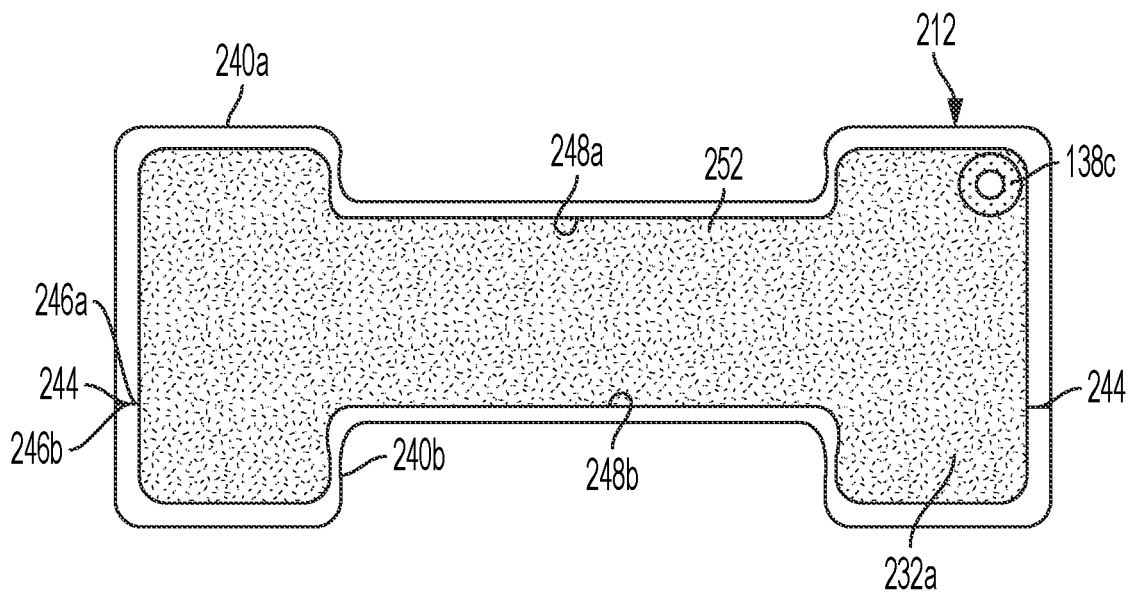
FIGS. 17A-17I depict cross sections of different configurations of the example composite structure of FIGS. 16A-16C.
Figure 17B:
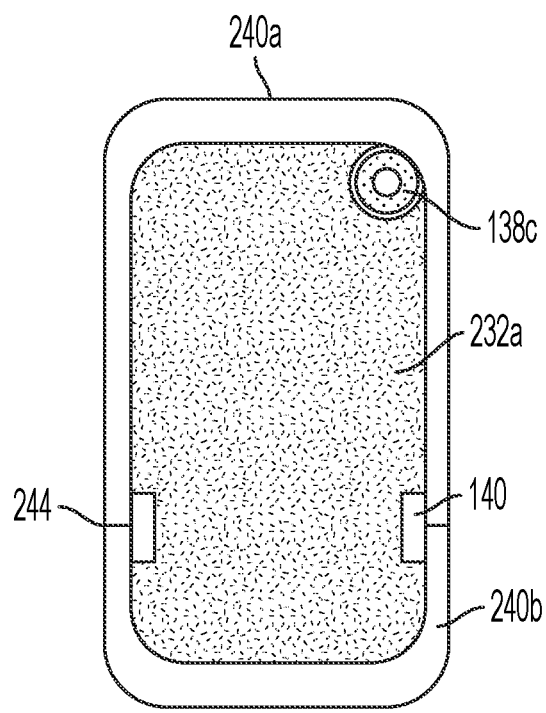

FIGS. 17A-H depict cross sections of an example composite structure in accordance with embodiments of the present disclosure. Although the example is of a chain stay assembly 212 as generally illustrated in FIGS. 13-16, it should be appreciated that the various configurations can be applied to other composite structures. As shown in FIG. 17A, at least at the cross-section taken along line A-A' of FIG. 14, the upper chain stay assembly portion 240a is joined to the lower chain stay assembly portion 240b by a butt joint 244. Accordingly, an edge portion 246a of the upper chain stay assembly portion 240a and an edge portion 246b of the lower chain stay assembly portion 240b abut and are fused or otherwise joined to one another. In addition, an interior surface 248a of the upper chain stay assembly portion 240a and an interior surface 248b of the lower chain stay assembly portion 240b define an interior volume 252 therebetween. Moreover, in this example, at least at line A-A' the interior volume 252 is occupied by a composite block member 232a. As described in greater detail elsewhere herein, the composite block member 232 can be fused or otherwise joined to the chain stay assembly portions 240, forming an integral composite structure. At least in areas of the butt joint 244 adjacent the composite block member 232a, a welding strip can be replaced by the composite block 232a. In other embodiments, a welding strip 140 can be provided between the area of the butt joint 244 and the composite block member 232a (as shown in FIG. 17B, which is an example of a cross-section taken along section line B-B' of FIG. 14). In accordance with at least some embodiments of the present disclosure, the composite structure can additionally include one or more braided tubes 138. For instance, as shown in the figure, a braided tube 138c can be provided as a guide or passageway to house an electronic control and/or power cable, a mechanical control cable, a hydraulic line, hydraulic fluid, or the like. In addition, multiple braided sleeves 138 can be included, for example to operate or control multiple different mechanisms or devices. If included, at least portions of a braided sleeves 138 in the form of a guide or passageway can be disposed between an exterior surface of the composite block 132a and an interior surface 248a or 248b of the composite panels, and/or can be disposed within a receiving channel formed partially or entirely within the composite block 132a. Moreover, the braided tube 138 can be fused to the composite block 132 and/or to an interior surface 248a or 248b.

Figure 17C:
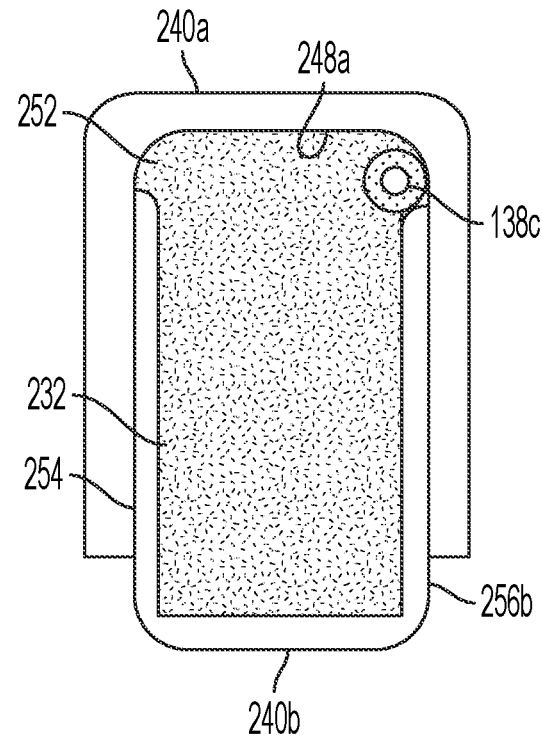
Figure 17D:
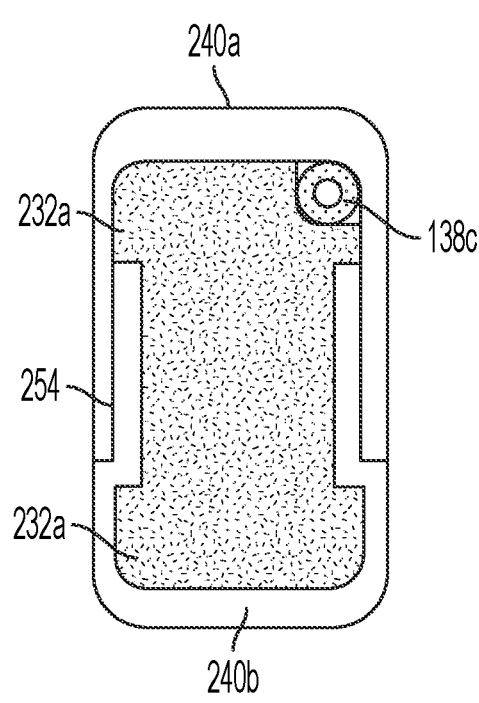
Figure 17E:
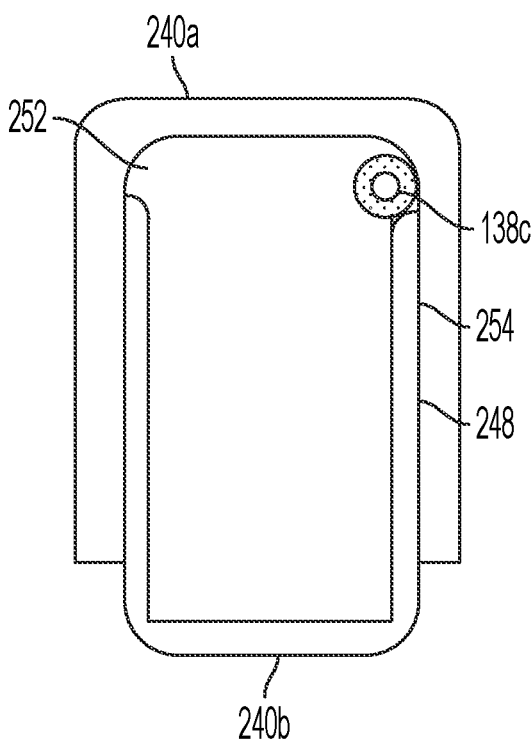
Figure 17F:
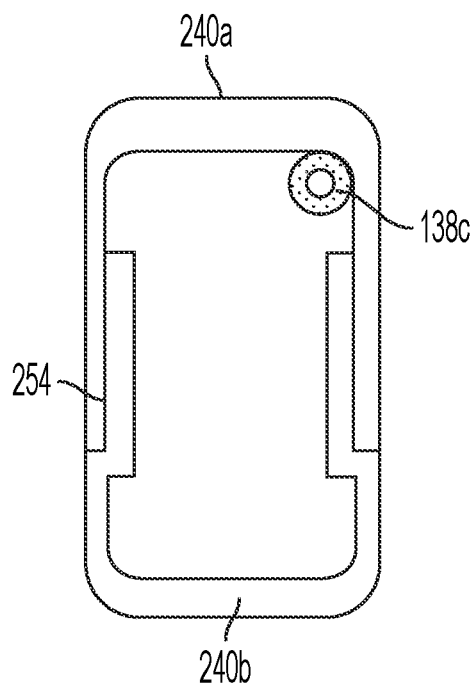
Figure 17G:
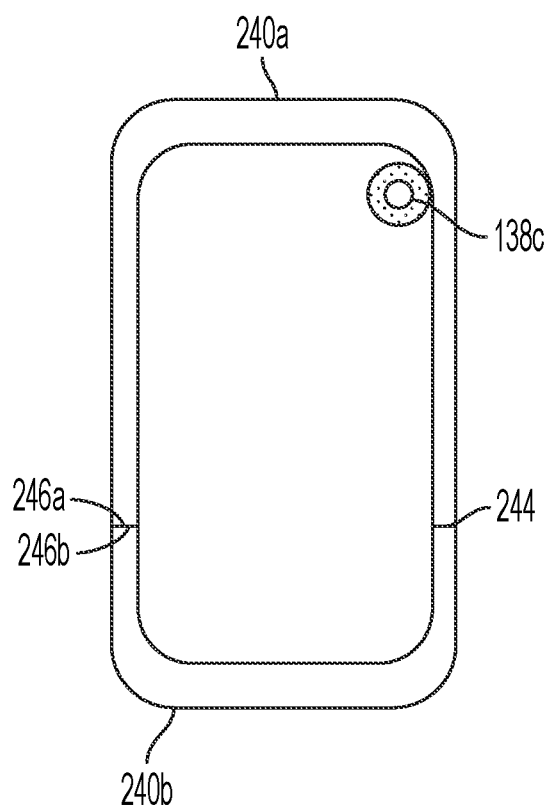

As shown in FIGS. 17C and 17D, which are views of an example of the chain stay assembly 212 in a cross-section taken along line B-B' of FIG. 14, the upper chain stay assembly portion 240a can be joined to the lower chain stay assembly portion 240b by a plain overlapping joint 254 (FIG. 17C), or by a recessed overlapping joint 254 incorporating a joggle 258 in one of the portions 240 (here the lower chain stay assembly portion 240b), which creates a shoulder portion 262, against which an end portion 246a of the upper chain stay assembly portion 240a abuts (FIG. 17D). Moreover, although illustrated at section line B-B', these and other joint configurations can be used at other locations. Accordingly, different joint types can be established between components of a composite structure at different locations of interconnection between those components. In this example, a portion of the interior surface 248a of the upper chain stay assembly portion 240a is joined to an exterior surface 256b of the lower chain stay assembly portion 240b. In addition, interior surfaces 248 of the upper chain stay assembly portion 240a and the lower chain stay assembly portion 240b define an interior volume 252 that is occupied by a composite block member 232, such that exterior surfaces of the composite block 132 in that area are entirely in contact with and fused to the interior surfaces 248a and 248b of the composite panels (except in an area of the braided sleeve 138c). As can be appreciated by one of skill in the art after consideration of the present disclosure, the overlapping joint 254 can be alternately configured. For instance, the exterior surface of the upper chain stay assembly portion 240a can be joined to an interior surface of the lower chain stay assembly portion 240b. As another example, a recessed lap joint can include an area of reduced thickness in one or both of the composite panels in the area of overlap.

Figure 17H:
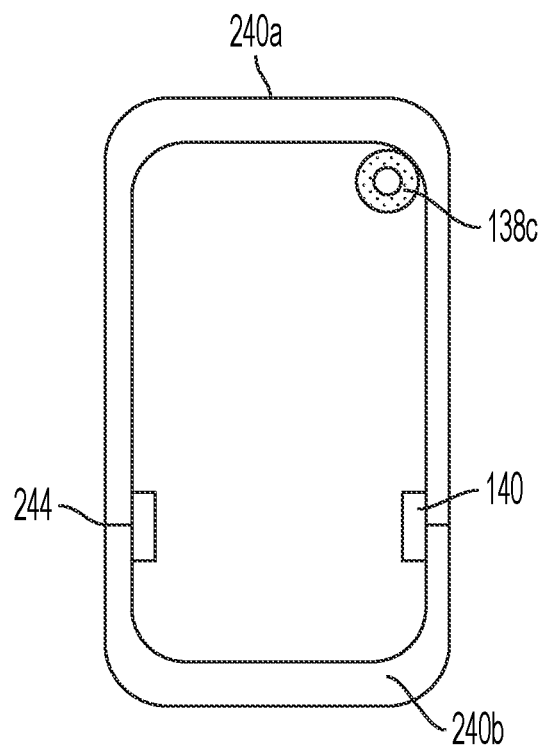
Figure 17I:
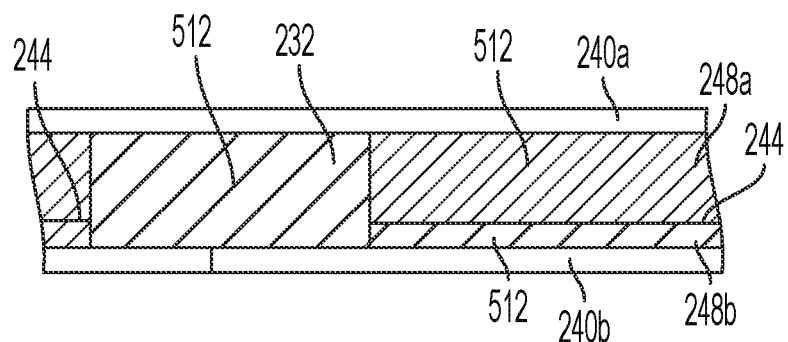

With reference now to FIGS. 17E-H, different example joints that can be established between component portions are illustrated at a cross-section taken along line C-C' of FIG. 14, which in this example is an area in which a composite block is not included. Accordingly, interior surfaces 248 of the upper chain stay assembly portion 240a and the lower chain stay assembly portion 240b define an interior volume 252 that is open or unfilled. More particularly, the joints can include a plain overlapping joint 254 (FIG. 17E), a recessed overlapping joint 254 (FIG. 17F), a butt joint 244 (FIG. 17G), and a butt joint 244 with a welding strip 140 (FIG. 17H). Alternatively or in addition, the upper chain stay assembly portion 240a can joined to the lower chain stay assembly portion 240b by or along a joint that includes various alignment features, such as locating pins or ridges in one of the portions that are received by corresponding holes or troughs in the other one of the portions.

FIGS. 18A-18C depict views composite structure components, and in particular of portions of a chain stay assembly 212 in accordance with other embodiments of the present disclosure. In FIG. 18A, a lower chain stay assembly portion 240b is depicted in a top plan view, FIG. 18B depicts composite block members 232 and braided sleeves 138 that can be incorporated into the chain stay assembly 212. FIG. 18C depicts the various composite block members 232 and braided sleeves 138 positioned within or relative to the lower chain stay assembly portion 240b. In this example, three composite block members 232 are shown: a first composite block member 232a that occupies areas of a front pivot point in both left and right chain stay portions and a connecting or bridge portion between the left side and right side chain stay portions; a second composite block member 232b that occupies an area at a rear end of the right side chain stay portion, for example in an area in which attachment elements or integral surfaces for receiving a portion of a rear wheel axel or fastener, for receiving a derailleur, for establishing a pivot point, and for receiving or otherwise providing mounting or locating points for other components is located; and a third composite block member 232c that occupies an area at a rear end of the left side chain stay portion, for example in an area in which attachment elements for receiving another portion of the rear wheel axel or fastener, for receiving brake caliper mounting hardware, for establishing a pivot point, or for otherwise providing mounting or locating points for other components is located. Braided sleeves 138a and 138b are included that extend along at least a portion of the longitudinal extents of the right and left sides of the chain stay assembly 212. In accordance with embodiments of the present disclosure, an end of a braided sleeve 138 can abut or can be spaced apart from a composite block 232. In accordance with further embodiments of the present disclosure, at least portions of the braided sleeves 138 can be formed over other components. For example, a first end of the braided sleeves 138*a* and 138*b* can extend over portions of the composite block member 232*a* within a first overlap area 272 and a second end of the braided sleeves 138*a* and 138*b* can extend over respective portions of the composite blocks 232*b* and 232*c* within a second overlap area 276 (see FIG. 18C). In addition, a braided sleeve 138*c* that can be included to form a guide or housing for a control cable or line is illustrated. Although shown as being provided as structural reinforcing members in both the left and right chain stay portions of the assembly 212, it should be appreciated that asymmetrical arrangements are possible. For instance, a braided sleeve 138 can be provided as a reinforcing member only in the drive side chain stay of the assembly 212.

Figure 19A:
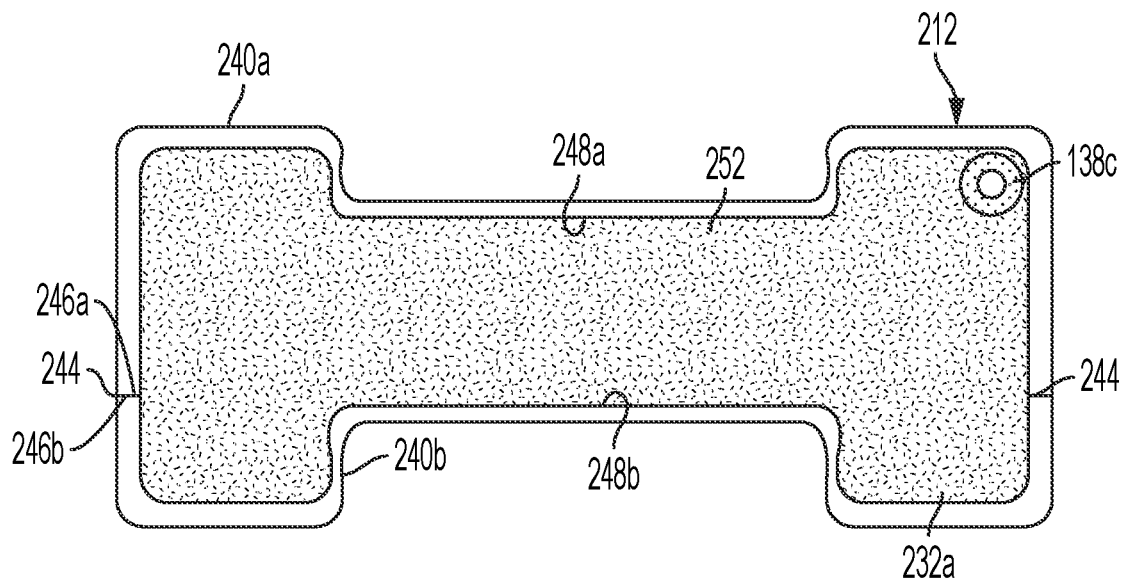
FIGS. 19A-19H depict cross sections of different configurations of the example composite structure of FIGS. 18A-18C.

FIGS. 19A-H depict cross sections of the example composite structure in accordance with embodiments of the present disclosure. Although the example is of a chain stay assembly 212 as generally illustrated in FIGS. 13-15 and 18, it should be appreciated that the various configurations can be applied to other composite structures. As shown in FIG. 19A, and similar to the embodiment of FIG. 17A, at least at the cross-section taken along line A-A' of FIG. 14, the upper chain stay assembly portion 240*a* is joined to the lower chain stay assembly portion 240*b* by a butt joint 244. Accordingly, an edge portion 246*a* of the upper chain stay assembly portion 240*a* and an edge portion 246*b* of the lower chain stay assembly portion 240*b* abut and are fused or otherwise joined to one another. In addition, an interior surface 248*a* of the upper chain stay assembly portion 240*a* and an interior surface 248*b* of the lower chain stay assembly portion 240*b* define an interior volume 252 therebetween. Moreover, in this example, at least at line A-A', the interior volume is occupied by a composite block member 232*a*. The composite block member 232 can be fused or otherwise joined to adjacent portions of the chain stay assembly 240, forming an integral composite structure.

Figure 19B:
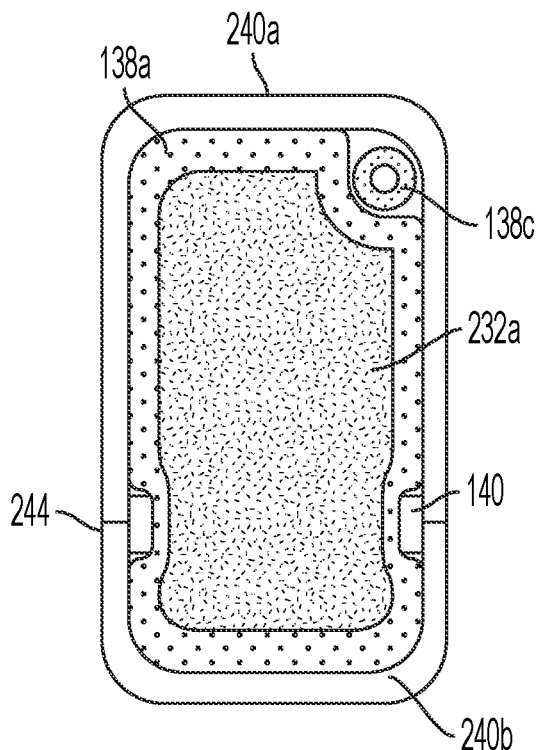
Figure 19C:
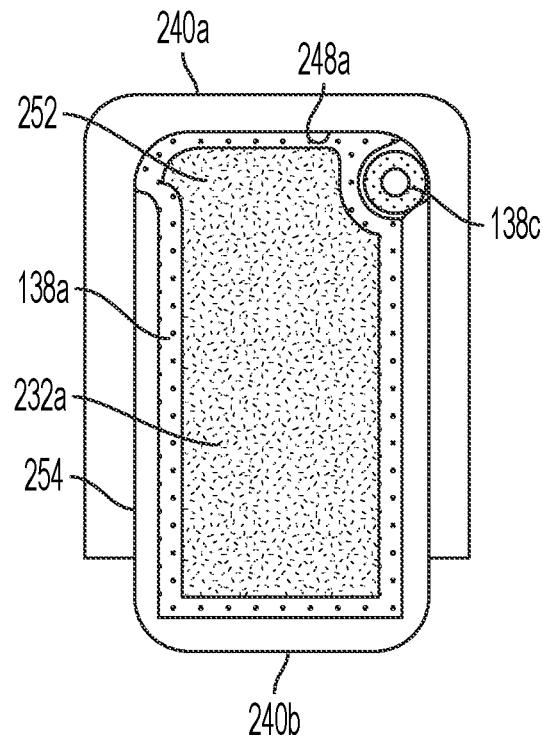
Figure 19D:
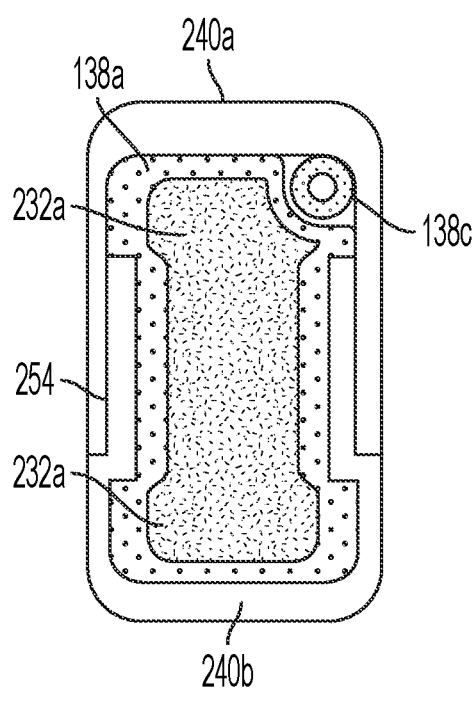
Figure 19E:
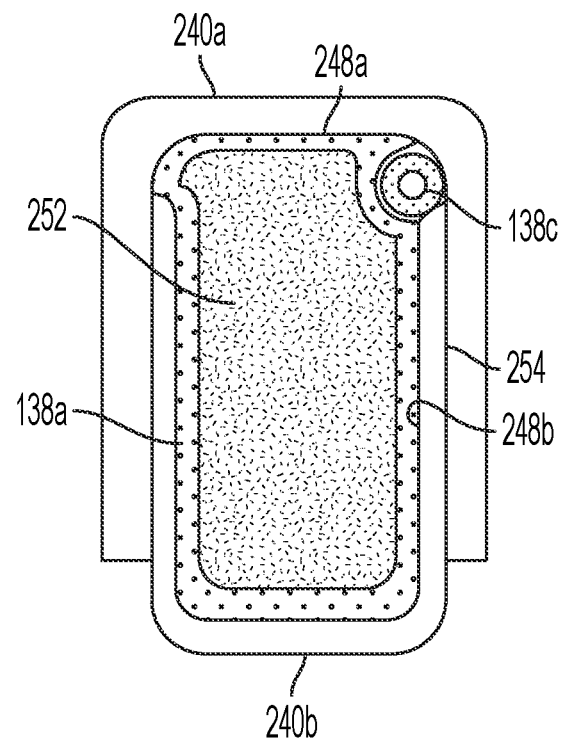
Figure 19F:
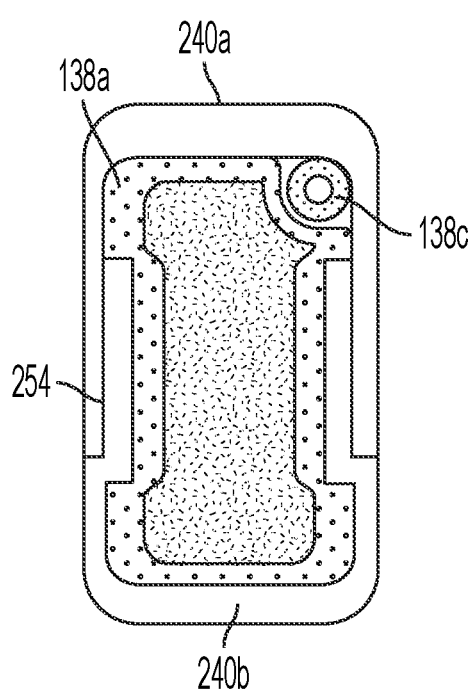
Figure 19G:
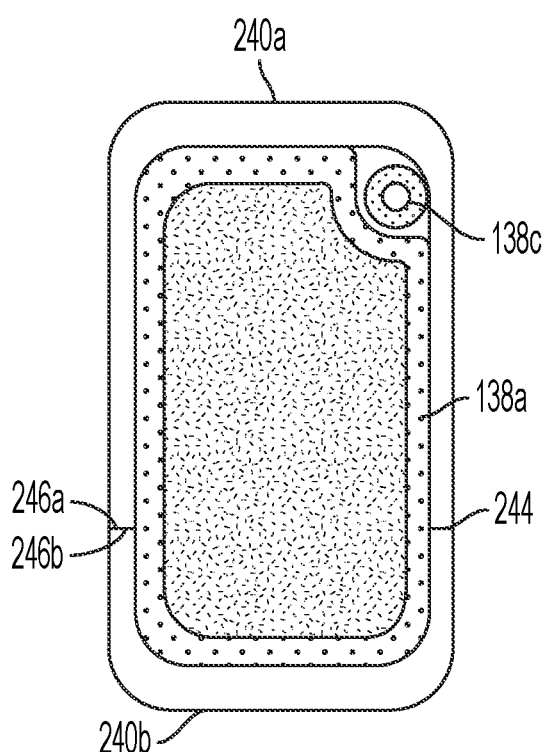

In accordance with at least some embodiments of the present disclosure, at least a portion of a braided sleeve 138*a* can be interposed between a composite block 232 and interior surfaces of composite structure components. For example, as shown in FIGS. 19B-19D, which are views of an example of the chain stay assembly 212 in a cross-section taken along line B-B' of FIG. 14, a braided sleeve can surround a composite block 232 or a portion of the composite block 232. At least at that section, the completed assembly 212 is a fused structure that includes the chain stay assembly portions 240, the braided sleeve 138, and the composite block 232. As examples, a junction between the upper 240*a* and lower 240*b* chain stay assembly portions can include a butt joint 244 with a weld strip 140 between the joint 244 and the braided sleeve 138 (FIG. 19B), a plain overlapping joint 254 (FIG. 19C), or a recessed overlapping joint 254 (FIG. 19D). Accordingly, different joint types can be established between components of a composite structure at different locations of interconnection between those components. As can be appreciated by one of skill in the art after consideration of the present disclosure, other configurations of a joint between composite structure components in an assembly incorporating a braided sleeve 238 and a composite block 232 can be alternately configured.

Figure 19H:
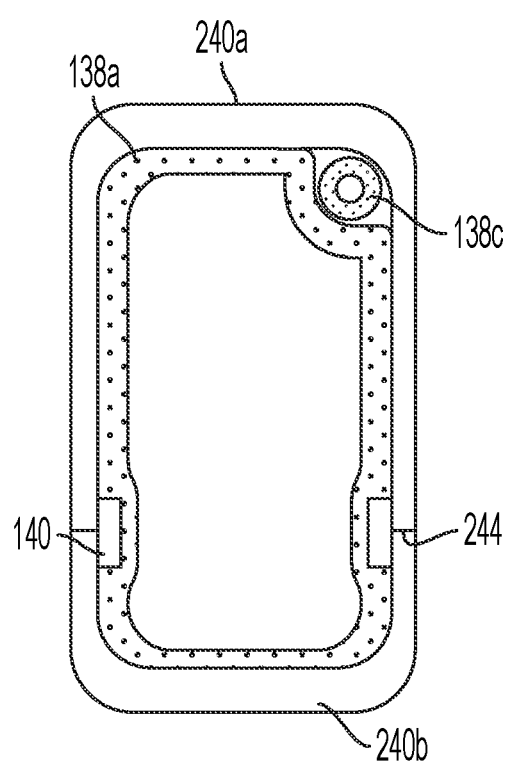

With reference now to FIGS. 19E-19H, different example joints that can be established between component portions in which a braided sleeve 138 is incorporated into the assembly are illustrated at a cross-section taken along line C-C' of FIG. 14, which in this example is an area in which a composite block is not included. Accordingly, interior surfaces 248 of the upper chain stay assembly portion 240*a* and the lower chain stay assembly portion 240*b* define an interior volume 252 that is in contact with an exterior surface of a braided sleeve 138, and with an open or unfilled volume defined by an interior surface of the braided sleeve 138. More particularly, the braided sleeve 138 can be disposed such that the exterior surface of the braided sleeve conforms to the interior surfaces 248*a* and 248*b* of the portions 240 of the assembly, and the joints between those portions 240 can include plain overlapping joints 254 (FIG. 19E), a recessed overlapping joint 254 (FIG. 19F), a butt joint 244 (FIG. 19G), and a butt joint 244 with a welding strip 140 (FIG. 19H). A braided sleeve 138 with an open interior volume can also be used with other types of joints between assembly portions 240, including but not limited to joints that also include various alignment features, such as locating pins or ridges in one of the portions that are received by corresponding holes or troughs in the other one of the portions.

Figure 20A:
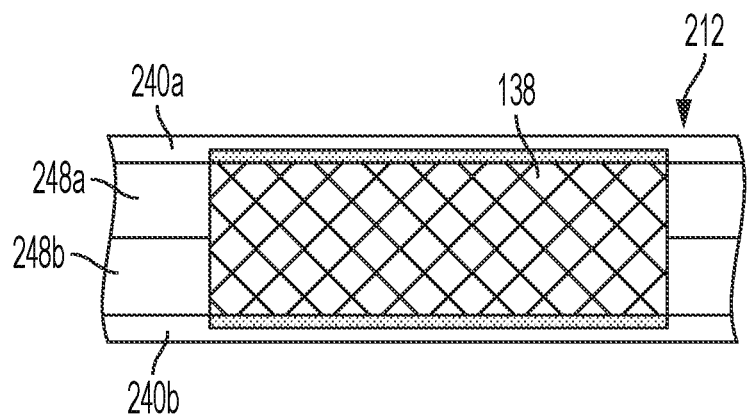
FIGS. 20A-20D depict portions of example variants of the composite structure of FIGS. 13 and 14.
Figure 20B:
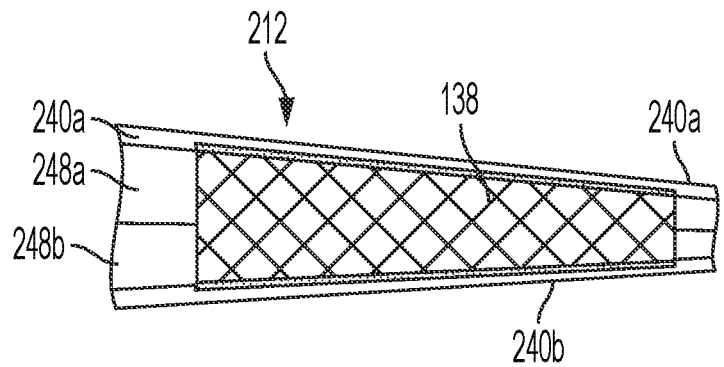
Figure 20C:
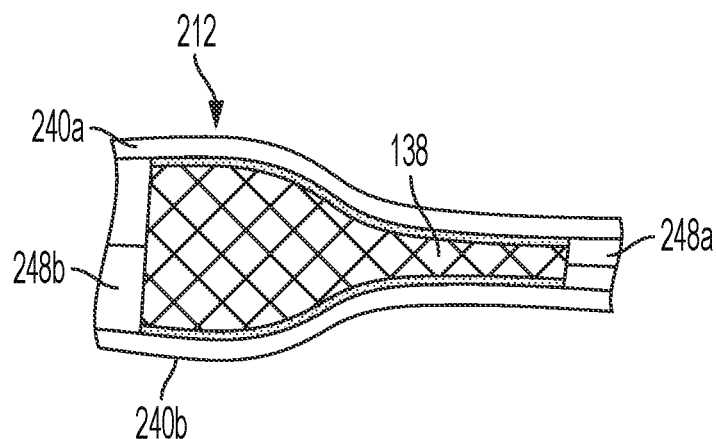
Figure 20D:
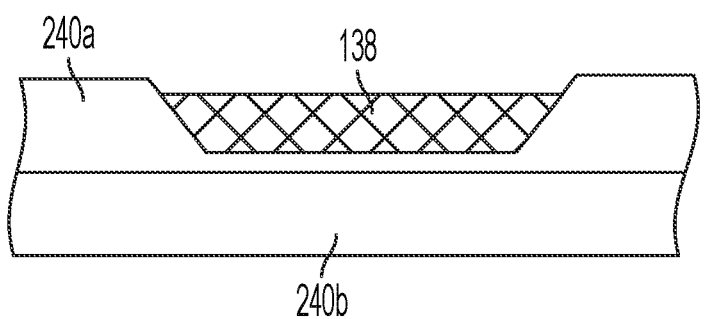

FIGS. 20A-20C depict portions of variations of a composite assembly, such as but not limited to a chain stay assembly 212, in accordance with embodiments of the present disclosure in a cross section view along section line D-D' of FIG. 14. As shown, a braided sleeve 138 can be disposed within an interior volume 252 formed between the interior surfaces 248*a* and 248*b* of component parts or portions 240*a* and 240*b* respectively. More particularly, an exterior surface of the braided sleeve 138 can be in contact with and can be fused to at least portions of the interior surfaces 248*a* and 248*b*. As depicted in FIGS. 20A and 20B, a thickness of the component parts 240 can be reduced in areas where the braided sleeve is in contact with those component parts 240. In addition, a braided sleeve 138 can not only conform to different interior volume shapes in a transverse cross-section, for example as depicted in FIGS. 19B-19H, but it can alternatively or additionally conform to different interior volume shapes in a longitudinal cross section direction, for example as depicted in FIGS. 20B and 20C. Moreover, as shown in FIGS. 20A-20C, a braided sleeve need not abut or receive a composite block 232. FIG. 20D depicts a portion of a composite structure, such as but not limited to a chain stay assembly 212, in a side elevation view. In this example, an aperture or window is formed in one or both of the portions 240, such that a portion of the exterior of the braided sleeve 138 forms a portion of the exterior surface of the assembly 212. However, other portions of the exterior of the braided sleeve 138 are in contact with interior surfaces of the portions 240. For example, at the ends of the braided sleeve 138, the entire outer circumference of the braided sleeve can be in contact with, and can be fused to, interior surfaces 248 of the portions 240. Moreover, along at least one continuous line extending between the ends of the braided sleeve 138, the braided sleeve is in contact with the interior surface 248 of at least one of the portions 240.

In accordance with embodiments of the present disclosure, and as illustrated in FIG. 21, a composite structure component, such as but not limited to a component or part of a chain stay assembly 212, can be formed from a composite panel 404, in this case in a size that encompasses an overall area of the component. The composite panel 404 includes a number of layers or sheets of fiber reinforced thermoplastic material 504 (for example as illustrated in FIG. 6). In this way, a seat stay 204 or chain stay assembly 212 or other assembly can be constructed in a manner similar to a composite structure 104. FIG. 22 depicts an example of a first sheet 504*a* of a fiber reinforced thermoplastic material, with the fibers 512, such as but limited to carbon fibers, embedded in, impregnated with, or otherwise interposed with a thermoplastic material 508, that extend between opposite edges of the sheet 504a, and that are oriented along a first direction. FIG. 23 depicts an example of a second sheet 504b of a fiber reinforced thermoplastic material, with fibers 512 that extend between opposite edges of the sheet 504b, and that are oriented along a second direction. FIG. 24 depicts an example of a third sheet 504c of a fiber reinforced thermoplastic material, with relatively short, randomly oriented fibers 512. As illustrated in the figures, the individual sheets 504a-c can be cut or trimmed into a shape that approximates a shape of the composite structure component after forming, prior to being joined to one another to form a composite panel 404. Alternatively or in addition, the composite panel 404 incorporating the sheets 504 can be cut or trimmed after the sheets 504 have been joined to one another. As shown, fibers in at least two the first 504a and second 504b sheets can be cut or interrupted as part of forming the finished composite panel. For example, in forming a first open aperture 1208 in a first sheet 504a, a first reinforcing fiber 512a can be segmented into a first segment 512a1 and a second segment 512a2.

FIG. 25 is a detail of a portion of a composite structure at which a discontinuity 260 between edge segments 246 is present. As can be seen in this figure, different fibers 512 can extend between different portions of the structure. For example, a first fiber 512a can extend between a first discontinuity 260a and edge segment 256h, a second fiber 512b can extend between the first discontinuity 260a and a second discontinuity 260b, a third fiber 512c can extend between edge segment 256a and the second discontinuity 260b, and a fourth fiber 512d can extend between edge segment 256a and edge segment 256g.

Figure 26:
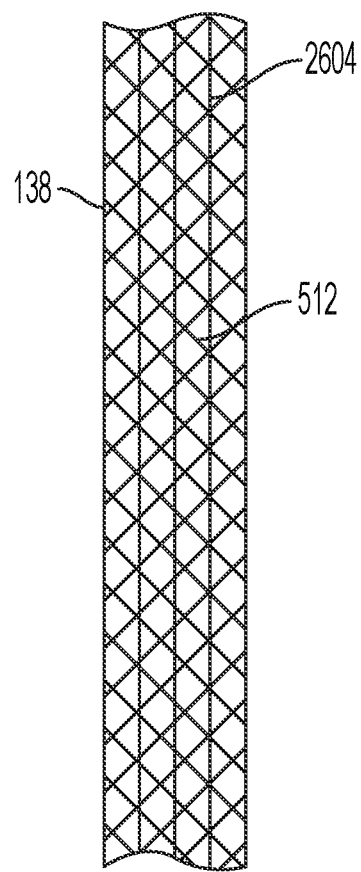
FIG. 26 depicts a seamless braided sleeve in accordance with embodiments of the present disclosure.

A braided sleeve 138 in accordance with embodiments of the present disclosure is depicted in FIG. 26. In general, the braided sleeve 138 is a seamless, tubular structure formed from a braid of reinforcing fibers 512, such as but not limited to carbon fibers, and thermoplastic or thermoplastic impregnated threads or fibers 2604. The braided sleeve 138 can be configured in various nominal exterior diameters, and can be formed to have any length. At least prior to incorporation into a composite structure, the braided sleeve 138 is a flexible woven or braided fabric, such that exterior surfaces of the braded sleeve 138 can be placed against surfaces that are not strictly cylindrical. Accordingly, the braided sleeve 138 can be manipulated such that it can be placed in contact with interior surfaces of component parts 240 that define curved, asymmetric, or irregular volumes, within at least some range of volume sizes and configurations. In accordance with further embodiments of the present disclosure, the braided sleeve 138 can have a nominal diameter that can be increased by increasing a spacing between adjacent reinforcing fibers 512 and thermoplastic threads or fibers 2604, and that can be decreased by decreasing a spacing between adjacent reinforcing fibers 512 and thermoplastic threads or fibers 2604.

Figure 27:
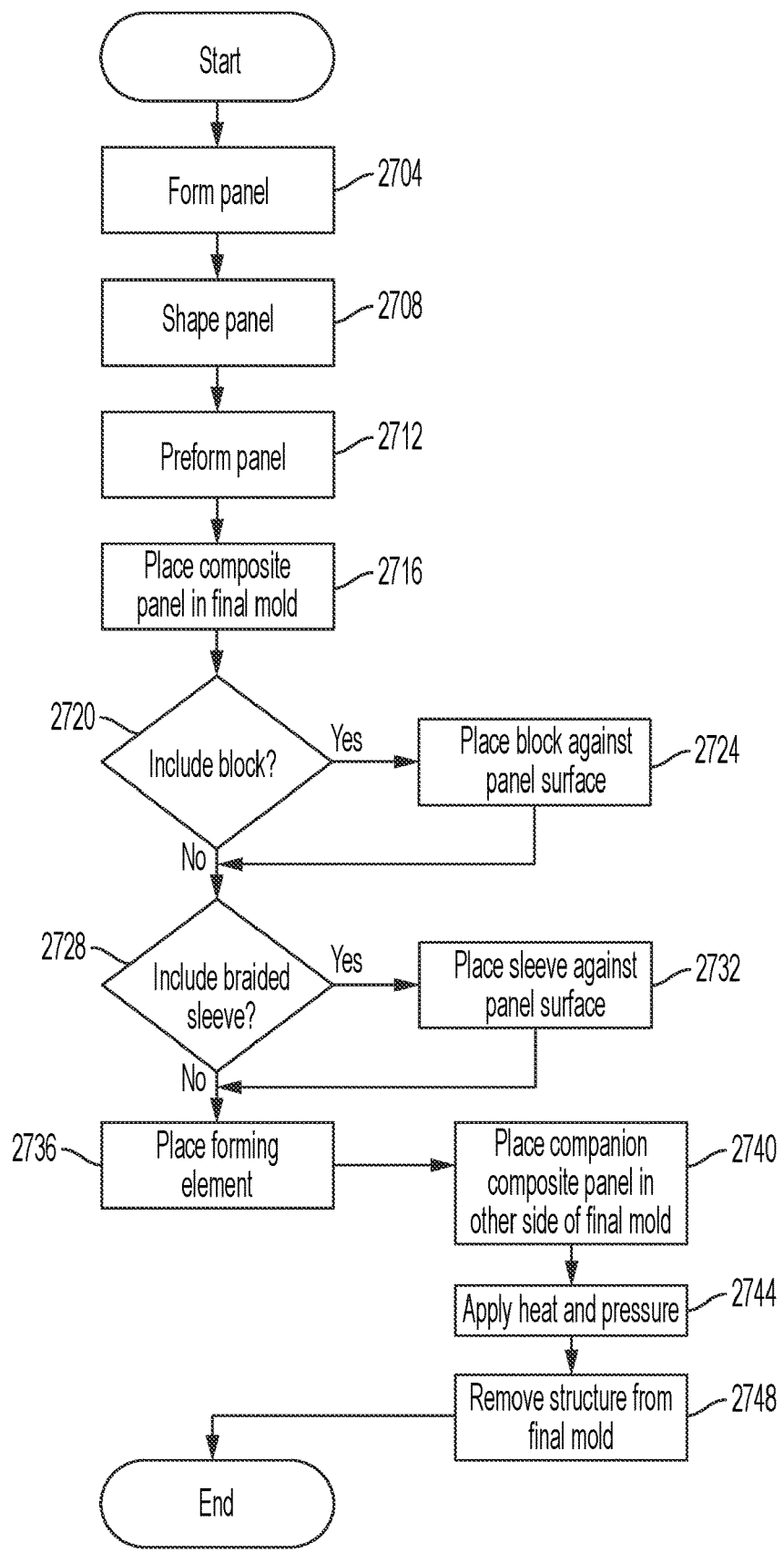
FIG. 27 is a flowchart illustrating aspects of a method of forming a composite structure in accordance with embodiments of the present disclosure.

With reference now to FIG. 27, aspects of a process or method for producing a composite structure 104 in accordance with embodiments of the present disclosure are depicted. Initially, at step 2704, a single composite panel 404 is formed. Forming the composite panel 404 can include selecting or forming from a larger piece of material a composite sheet that contains one or more sheets 504 of appropriate size, that incorporate a thermoplastic material 508, and that have reinforcing fibers 512 in selected orientations. In addition, forming the composite panel 404 can include creating a layup or stack of composite sheets 504, with different composite sheets 504 having a selected fiber 512 density and orientation relative to the other sheets 504. The stack can include one or more spacer layers containing a filler material, but not fibers, and the same thermoplastic material as the thermoplastic material 508 of the other sheets 504. The composite sheets 504, and any spacer layers, within the stack can then be fused using heat and pressure, to form the composite panel 404. More particularly, forming the composite panel 404 can include heating the thermoplastic material 508 in the composite sheets 504 to equal to or greater than the melting point of the thermoplastic material in order to fuse the composite sheets 504 to one another. The pressure applied during the composite panel 404 forming process can be greater than 100 psi. In further embodiments, the pressure applied during the composite panel 404 forming process can be greater than 400 psi. In still other embodiments, the pressure applied during the composite panel 404 forming process can be greater than 1000 psi. The composite panel 404 may have a generally flat or planar configuration, At step 2708, the composite panel 404 is shaped. Shaping the composite panel 404 can include cutting or trimming exterior boundaries of the composite panel to approximate a shape of the component part to be formed, entirely or in part, by the composite panel 404. In addition, shaping the composite panel 404 can include forming a closed aperture 524 within a perimeter of the panel 404, and/or forming an open aperture 1208 that crosses a perimeter of the composite panel 404. In accordance with further embodiments of the present disclosure, forming a composite panel 404 can also include giving the panel 404 a selected contour or three-dimensional shape, for example to approximate a final shape of the composite structure component 108 or 240 formed from the composite panel 404, and/or the final mold.

The composite panel 404 can then be preformed (step 2712). Preforming the composite panel 404 can include disposing the panel 404 on or adjacent a preform mold while applying heat to make the panel more pliable. For example, a heated fluid or a matched mold can be applied to a side of the composite panel 404 opposite the side adjacent the preform mold, causing the composite panel 404 to conform to or approximate the shape of the mold. Alternatively or in addition, the preform mold itself can be heated. In general, the heating of the composite panel 404 is controlled so as to maintain the temperature of the thermoplastic material 508 within the fused composite sheets 504 of the composite panel 404 to a temperature that is at or above the glass transition temperature and at or below the melting temperature of the thermoplastic material 508. The preform molding step forms a preformed composite panel or portion 240. In accordance with at least some embodiments of the present disclosure, the step of preforming, to create a preformed composite panel need not be performed, and the composite panel 404 can be placed in a final mold as a planar or substantially planar element.

Figure 28:
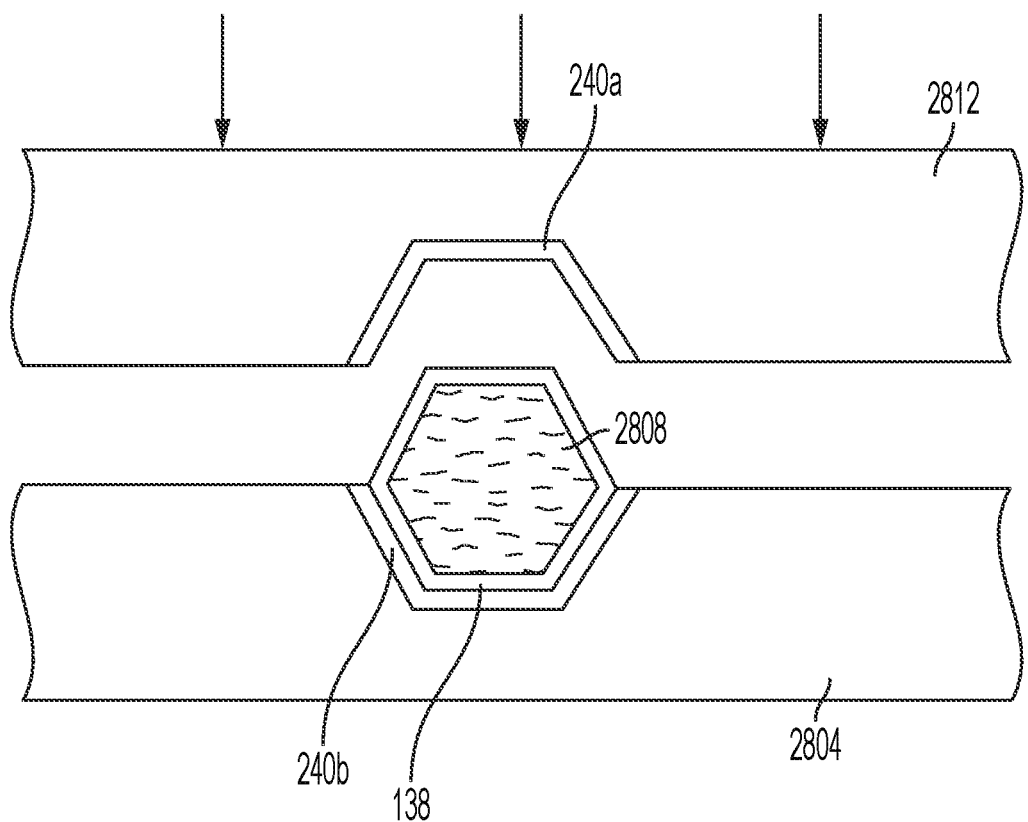
FIG. 28 depicts a shaping, molding, and fusing step in accordance with embodiments of the present disclosure.

At step 2716, the preformed composite panel 240, or if no preforming is performed, the composite panel 404, is placed in one side of a final mold 2804 (see FIG. 28). Next a determination is made as to whether a composite block 232 will be incorporated into the composite structure (step 2720). If a composite block 232 is to be included, it is sized and otherwise configured, and is placed against an interior surface of the composite panel 404 (step 2724). After placing any composite blocks 232, or if no composite blocks 232 are to be included, the process can next include a determination as to whether a braided sleeve 138 will be included in the composite structure (step 2728). If a braided sleeve 138 is to be included, it is sized and placed against a surface of the composite panel 404 (step 2732). Where one or more composite blocks 232 are included in the composite structure, placing the braided sleeve can include abutting an end of the braided sleeve 138 against a surface of a composite block 232, and/or placing a portion of the braided sleeve 138 over a portion of a composite block 232. Moreover, placing a braided sleeve 138 can include placing a braided sleeve 138 having a nominal diameter that is equal or about equal (e.g. within +/−10%) to an average diameter of an interior volume between panels 240, and having a length that extends for at least most of a length of a component portion formed by the panels 240. In accordance with at least some embodiments of the present disclosure, the braided sleeve 138 is positioned so that it forms an interior layer of composite materials in the composite structure. That interior layer can be located in or adjacent areas of the panels 240 having an otherwise reduced thickness.

Next, a forming element 2808 (see FIG. 28) is placed in an interior volume between the panels 240 (step 2736). In accordance with embodiments of the present disclosure, a forming element 2808 is a bladder, inflatable bladder, or a mandrel that is used to maintain a desired interior volume characteristic of the composite structure. In general, a forming element 2808 or a portion of a forming element is placed in areas that in the finished component will be an open volume between opposing interior surfaces of adjacent components 108 or 240. Where a braided sleeve 138 is included in the composite structure, a forming element 2808 or a portion of a forming element can be disposed within an interior of the braided sleeve 138 so as to shape or conform the braided sleeve 138 to an interior surface of the adjacent component 108 or 240, as depicted in FIG. 28. In connection with a braided sleeve 138 provided as a cable guide or the like, an insert or mandrel can be placed therein to maintain a desired interior channel or passageway.

At step 2740, a companion composite panel 404, for example shaped into a portion 240 of the component using the process described above, is placed in another side 2812 (FIG. 28) of the final mold 2804. The mold halves are then brought together, and heat and pressure are applied to fuse the composite panels 404 to one another, and to any included composite blocks 232 and braided sleeves 138 (step 2744). The formed composite structure 104, in the three-dimensional shape imparted by the final mold 1108, is then cooled and removed from the final mold 1108 (step 2748). Any bladders, mandrels, or other internal forming elements 2808 can then be removed from the completed structure. Alternatively, any forming elements provided as sacrificial components can be left in the structure. The composite structure is then complete, and is ready for final finishing, such as sanding and painting.

Individual composite structures formed from one or multiple composite panels 404, can be joined together to form larger composite structures during or after a step of final molding. Accordingly, the formation of composite structure components 108 in their final form, and the formation of the composite structure 104 from such components 108, can be performed simultaneously. For instance, multiple preformed composite panels 404 can be fused to one another during a step of final molding. As another example, composite structures can be joined together after final molding by fusing or bonding the different structures, including unitary or multiple component structures, to one another, forming a larger composite structure. Fusing can include reheating the individual structure in the area of the joint to a temperature that is at or less than the melting point of the composite, and at or higher than the heat deflection temperature, per ASTM D648, of the composite. As still another example, structures formed from multiple sub-structures can be bonded to one another using an adhesive. The joint at the seam or interface between the individual composite structures can be a butt joint, a lap joint, or can include different types of joints at different locations.

As discussed herein, one or more composite blocks 232 and/or braided sleeves 138 can be joined to a surface or surfaces of one or more composite panels 404 during the forming process. A composite block 232 can extend between opposing interior surfaces of composite panels 404, and can function to apply pressure to those opposing surfaces during molding or forming of a composite structure. A braided sleeve 138 can be placed in contact with interior surfaces of composite panels, and can provide an additional layer or layers of long reinforcing fibers 512, as well as additional thermoplastic material. Moreover, during the step of heating and applying pressure, a composite block or blocks 232 and braided sleeves 138 can be fused to a panel or panels 404 and can then function as part of an integral composite structure, including but not limited to a mainframe 104, a seat stay 208, or a chain stay assembly 212 of a bicycle.

In accordance with embodiments of the present disclosure, a composite block 232 can be formed from trimmings or other waste material resulting from the production of various composite structure components. Accordingly, a composite block 232 can include a thermoplastic material and a plurality of fibers 512 embedded therein. Moreover, a composite block 232 can be formed by layering sheets of fiber reinforced thermoplastic material, compression molding, or injection molding. Where a composite block 232 is formed by layering, layers or panels having relatively long, unidirectionally aligned fibers can be collected or aggregated and selectively oriented within the composite block 232, and the various layers can be fused to one another. Fusing can include heating the aggregated fiber reinforced thermoplastic material to a temperature that is at or greater than the melting point of the thermoplastic material, and optionally by also applying pressure. Where a composite block 232 is formed by molding, a collection or aggregation of mulched or chipped fiber reinforced thermoplastic material can be used as the base stock. For compression molding, the fibers 512 can be relatively long, including long enough to extend from one side of the composite block 232 to another. The compression molding includes heating the aggregated thermoplastic fiber reinforced material to a temperature that is at or less than the melting point of the thermoplastic material, but higher than the deflection point of the thermoplastic material, and applying pressure using a mold. For injection molding, a finer mulch is desirable, so that the length of the fibers 512 is reduced, facilitating injection of the material into the mold. In addition, the injection molding process includes heating the aggregated thermoplastic fiber reinforced material to a temperature that is at or greater than the melting point of the thermoplastic material. Whether formed by layering or molding, the final three-dimensional shape of the composite block 232 can be finalized through trimming, sanding, or other processes.

Figure 29:
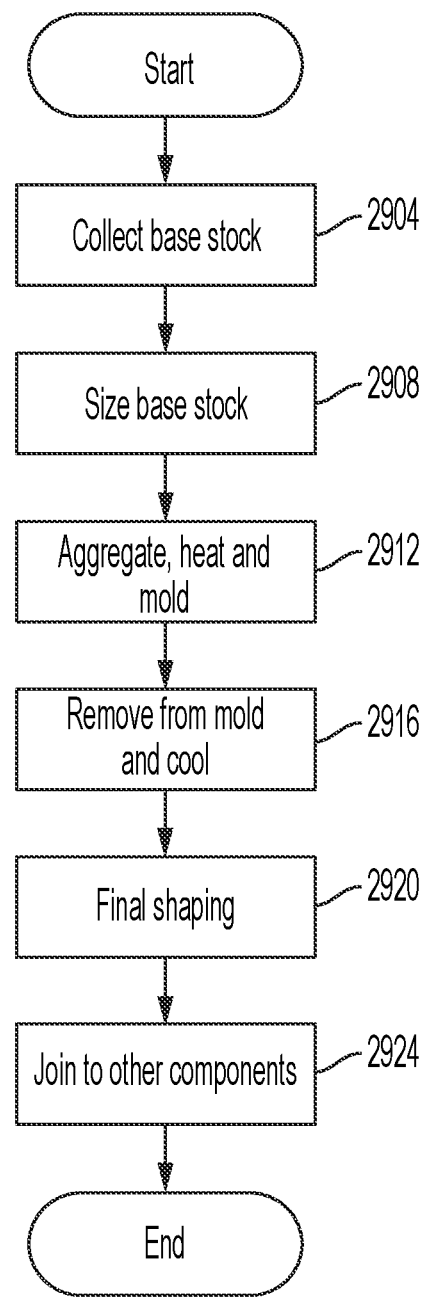
FIG. 29 is a flowchart illustrating aspects of a method of forming a composite structure in accordance with embodiments of the present disclosure.

FIG. 29 is a flowchart illustrating aspects of forming a composite block 232 by a molding process in accordance with embodiments of the present disclosure. Initially, at step 2904, base stock or material is collected or aggregated. The base stock can include fiber reinforced thermoplastic material that has been trimmed or otherwise removed from sheets or panels or even complete structures. Accordingly, the base stock can include fiber reinforced thermoplastic material separated from composite panels constructed in accordance with embodiments of the present disclosure that might otherwise be discarded as waste. Embodiments of the present disclosure thus provide methods for recycling fiber reinforced thermoplastic material. The base stock is then sized (step 2908). Sizing the base stock can include mulching or chipping to reduce included fiber lengths to less than or equal to a desired maximum size. As an example, for a compression molded composite block 232, the fibers 512 may be relatively long (e.g. greater than 6 mm in length), while for an injection molded composite block 232, the fibers 512 are relatively short (e.g. less than 6 mm in length). The sized base stock is then aggregated, heated and introduced to a mold (step 2912). In a compression molding process, the heated and sized base stock can be formed to a final or near-final composite block 232 shape by clamping the material between two mold halves. In an injection molding process, the sized base stock is heated until the thermoplastic material is liquefied or is sufficiently pliable for introduction to an injection mold. The thus formed composite block 232 is then removed from the mold and cooled (step 2916). The composite block 232 can then be finished by trimming away flash or otherwise performing a final shaping (step 2920). The shaped composite block 232 can then be joined to other components of a composite structure (step 2924). In accordance with embodiments of the present disclosure, joining the composite block 232 to other components can include placing the composite block 232 within an area of a finally or partially shaped composite panel, and joining a second composite panel to the first composite panel such that the composite block is held within a volume defined by interior surfaces of the composite panels, and heating the components to fuse them to one another. Accordingly, joining a composite block 232 to other composite structure components and the joining of those other composite structure components can be performed simultaneously. The process can then end.

As discussed herein, the composite sheets 504 can include one or more sheets having a large number of randomly oriented fibers 512 that are impregnated in a thermoplastic material 508. More particularly, the fibers 512 are randomly oriented in at least a plane encompassing the edges of the composite sheet 504 while that sheet is held flat. The composite sheet 504 is relatively thin, for example, but without limitation, having a thickness of from about 0.3 mm to about 4 mm. The fibers 512 in such a sheet 504 are relatively short, having, for example, but without limitation, a length of from 4 mm to 25 mm. As another example, the fibers in a sheet 504 having relatively short, randomly oriented fibers, can be from about 2 mm to about 25 mm in length, where about is +/−10% of the nominal length. Moreover, fibers 512 of different lengths can be incorporated into a single composite sheet 504. In accordance with the exemplary embodiments of the present disclosure, the composite sheets 504 includes from about 1 gram per cubic centimeter to about 2 grams per cubic centimeter of fibers 512. By volume, the ratio of fibers 512 to thermoplastic material 508 can be selected such that from 20% to 70% of the volume comprises fibers 512, and such that the remainder of the volume comprises the thermoplastic material 508. The fibers 512 of a sheet 504 having a unidirectional, woven, or random orientation can comprise fibers having a selected tensile strength. For example, the fibers 512 can have a high modulus or stiffness and/or high tensile strength (e.g. a modulus greater than 280 Gpa and a tensile strength greater than 2,500 Mpa), and can comprise carbon fibers. As another example, fibers 512 of different tensile strengths can be included in a single composite sheet 504. In accordance with at least some embodiments of the present disclosure, the fibers 512 may comprise recycled materials. For instance, the fibers 512 may be obtained from cuttings created in forming sheets of traditional, continuous ply carbon fiber materials. The thermoplastic material 508 can comprise any material that can be formed or re-formed by heating. For example, the thermoplastic material 508 may comprise a polyamide or a thermoplastic resin. In accordance with exemplary embodiments of the present disclosure, the composite sheet 504 weighs from about 1.2 g/cc to about 1.8 g/cc.

According to at least some embodiments of the present disclosure, composite structures or composite structure components are formed by molding one or more composite panels that each include one or more composite sheets containing a thermoplastic material and fibers impregnated with the thermoplastic material into a desired three-dimensional configuration. In accordance with further embodiments of the present disclosure, multiple composite structure components can be fused or otherwise joined together to form a composite structure. In accordance with still further embodiments, the formation of a composite structure containing multiple composite structure components, including composite panels and composite inserts, that are fused to one another can be performed simultaneously with the molding or final molding of composite panels into the final shapes of the respective composite structure components. Moreover, components formed from metal or other materials may be fused to one or more of the composite structure components at the same time that the composite structure components are fused to one another to form the composite structure.

The foregoing discussion has been presented for purposes of illustration and description. Further, the description is not intended to limit the disclosed structures, systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed structures, systems and methods, and to enable others skilled in the art to utilize the disclosed structures, systems and methods in such or in other embodiments and with various modifications required by the particular application or use. It is intended that the appended claims be construed to include alternative embodiments to the extent permitted by the prior art.

What is claimed is:

1. A composite structure, comprising:
 a first component, wherein the first component includes a panel incorporating a plurality of sheets of fiber reinforced thermoplastic material;
 a second component, wherein the second component includes a panel incorporating a plurality of sheets of fiber reinforced thermoplastic material;
 a first composite insert, wherein the first composite insert includes a plurality of reinforcing fibers and a thermoplastic material, and wherein at least a portion of the first composite insert is located within a first portion of an interior volume located between an interior surface of the first component and an interior surface of the second component; and
 a second composite insert, wherein the second composite insert includes a plurality of reinforcing fibers and a thermoplastic material, wherein at least a portion of the second composite insert is located within a second portion of the interior volume located between the interior surface of the first component and the interior surface of the second component, wherein the first and second components are fused to one another along at least a first joint portion, wherein the first composite insert is fused to at least one of the first and second components, and wherein the second composite insert is fused to at least one of the first and second components.

2. The composite structure of claim 1, wherein the first composite insert includes surfaces in contact with an interior surface of the first component and an interior surface of the second component.

3. The composite structure of claim 1, wherein the first composite insert has a three dimensional shape that at least partially conforms to a shape of the first portion of the interior volume, and wherein the second composite insert has a three dimensional shape that at least partially conforms to a shape of the second portion of the interior volume.

4. The composite structure of claim 1, further comprising a third composite insert, wherein the first composite insert is a composite block, wherein the second composite insert is a composite block, and wherein the third composite insert is a braided sleeve.

5. The composite structure of claim 4, wherein at least a first section of the interior volume is not round, wherein a portion of an exterior surface of the braided sleeve is fused to the interior surface of the first component at the first section, and wherein another portion of an exterior surface of the braided sleeve is fused to the interior surface of the second component at the first section.

6. The composite structure of claim 4, wherein the braided sleeve extends from the first portion of the interior volume to a second portion of the interior volume, and wherein, between the first and second portions, an entirety of the exterior surface of the braided sleeve is in contact with interior surfaces of the first or second components.

7. A method of forming the composite structure of claim 1, comprising:
   forming a first composite panel in three dimensions;
   forming a second composite panel in three dimensions;
   placing a first composite insert adjacent at least a portion of first interior surface of the first composite panel;
   placing a second composite insert adjacent at least another portion of the first interior surface of the first composite panel; and
   joining the first composite panel to the second composite panel, joining the first composite insert to the first and second composite panels, and joining the second composite insert to the first and second composite panels in a fusing step.

* * * * *